US012602871B2

(12) United States Patent
Gautron et al.

(10) Patent No.: US 12,602,871 B2
(45) Date of Patent: Apr. 14, 2026

(54) MESH TOPOLOGY GENERATION USING PARALLEL PROCESSING

(71) Applicant: NVIDIA CORPORATION, Santa Clara, CA (US)

(72) Inventors: Pascal Gautron, Speracedes (FR); Christoph Kubisch, Aachen (DE)

(73) Assignee: NVIDIA CORPORATION, Santa Clara, CA (US)

( * ) Notice: Subject to any disclaimer, the term of this patent is extended or adjusted under 35 U.S.C. 154(b) by 209 days.

(21) Appl. No.: 18/468,209

(22) Filed: Sep. 15, 2023

(65) Prior Publication Data

US 2024/0104845 A1      Mar. 28, 2024

Related U.S. Application Data

(60) Provisional application No. 63/410,586, filed on Sep. 27, 2022.

(51) Int. Cl.
| | |
|---|---|
| *G06T 1/00* | (2006.01) |
| *G06T 1/60* | (2006.01) |
| *G06T 17/20* | (2006.01) |

(52) U.S. Cl.
CPC ............... *G06T 17/20* (2013.01); *G06T 1/60* (2013.01)

(58) Field of Classification Search
CPC ..... G06T 15/005; G06T 19/00; G06T 11/001; G06T 11/40; G06T 11/60; G06T 17/20; G06T 1/60; G06T 2210/52; G06F 40/30; G06F 40/56

USPC .......................................................... 345/418
See application file for complete search history.

(56) References Cited

U.S. PATENT DOCUMENTS

| | | | | |
|---|---|---|---|---|
| 10,311,169 B1* | 6/2019 | Leedom | .................. | G06F 30/23 |
| 2009/0109219 A1* | 4/2009 | DeCoro | ............... | G06T 17/205 |
| | | | | 345/423 |
| 2019/0035140 A1* | 1/2019 | Fricke | ................... | G06T 15/506 |
| 2022/0245912 A1* | 8/2022 | Hu | ............................. | G06T 3/18 |
| 2022/0374304 A1* | 11/2022 | Beaumont | ............. | G06T 15/005 |

* cited by examiner

*Primary Examiner* — Gordon G Liu
(74) *Attorney, Agent, or Firm* — Squire Patton Boggs LLP; Sarah Mirza

(57) ABSTRACT

Various embodiments include techniques for generating topological data for a mesh included in a computer-generated environment. The mesh includes simple geometric shapes, such as triangles. The disclosed techniques identify vertices in the mesh that have the same position and have identical attributes, such as color, normal vector, and texture coordinates. The disclosed techniques further identify vertices in the mesh that have the same position but differ in one or more attributes. The techniques generate lists of the triangles that are adjacent to each vertex included in the mesh. The techniques generate a list of the unique edges included in the mesh. Further, the techniques are well suited for execution on highly parallel processors, such as graphics processing units, thereby reducing the time to generate this topological data. The topological data may then be efficiently used by other computer graphics processing operations.

22 Claims, 15 Drawing Sheets

To/From
Task Work Unit
207

GPC
208

Pipeline Manager
305

SM
310

Topology
Generator
Application
340

Texture
Unit
315

To/From
Memory
Interface
214
via
Crossbar
Unit
210

MMU
320

L1.5 Cache
335

Work Distribution
Crossbar
330

PreROP
325

To
Crossbar Unit
210 and
GPCs 208

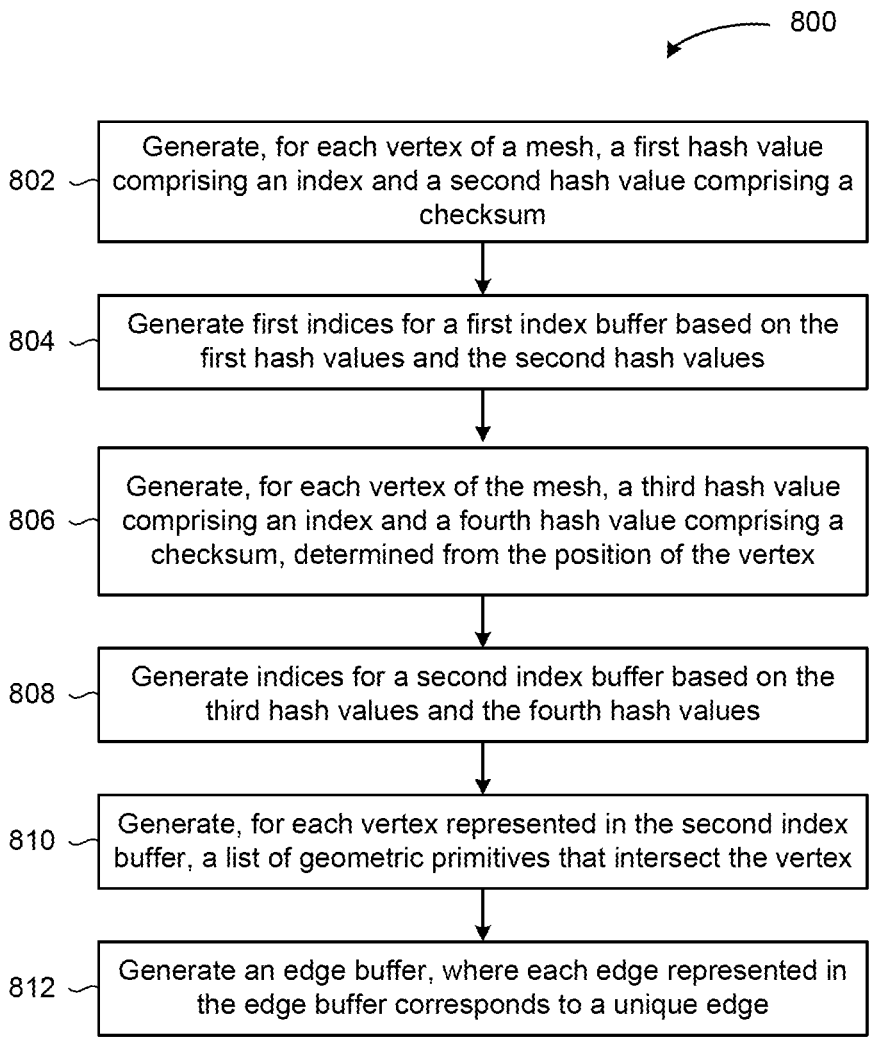

800

| 802 | Generate, for each vertex of a mesh, a first hash value comprising an index and a second hash value comprising a checksum |

| 804 | Generate first indices for a first index buffer based on the first hash values and the second hash values |

| 806 | Generate, for each vertex of the mesh, a third hash value comprising an index and a fourth hash value comprising a checksum, determined from the position of the vertex |

| 808 | Generate indices for a second index buffer based on the third hash values and the fourth hash values |

| 810 | Generate, for each vertex represented in the second index buffer, a list of geometric primitives that intersect the vertex |

| 812 | Generate an edge buffer, where each edge represented in the edge buffer corresponds to a unique edge |

FIGURE 8

MESH TOPOLOGY GENERATION USING PARALLEL PROCESSING

CROSS-REFERENCE TO RELATED APPLICATIONS

This application claims benefit of the U.S. Provisional patent application titled, "PARALLEL MESH TOPOLOGY BUILDER," filed on Sep. 27, 2022, and having Ser. No. 63/410,586. The subject matter of this related application is hereby incorporated herein by reference.

BACKGROUND

Field of the Various Embodiments

Various embodiments relate generally to graphics computing system architectures and, more specifically, to mesh topology generation using parallel processing.

Description of the Related Art

A computing system generally includes, among other things, one or more processing units, such as central processing units (CPUs) and/or graphics processing units (GPUs), network adapters, and one or more memory systems. In computer graphics, object modeling software executed by CPUs and/or by GPUs is used to generate object models to be rendered as part of a scene in a still image or an animation. These object models may be expressed as meshes of connected geometric primitives, such as triangles, quadrilaterals, and the like. The meshes are often not organized in a manner that facilitates further mesh processing operations. Accordingly, a topology generating program processes geometric primitives included in the mesh to generate a mesh topology. The resulting mesh topology may be more efficiently accessed by mesh processing operations that further process the mesh.

Conventional geometry processing algorithms for generating topology from a mesh execute on CPUs and feature a number of iterative steps that do not lend themselves to parallel execution. As a result, conventional topology generating programs execute serially, where the time to generate topology from a mesh may increase significantly as the size of the mesh increases. If the mesh processing operations only need to generate a topology of the mesh once, then this inefficiency may be acceptable. However, some mesh processing operations involve a number of iterations, where a new topology is generated with each iteration. In such cases, the topology generator executes multiple times, which may lead to long latencies, particularly for generating topologies for large meshes.

As the foregoing illustrates, what is needed in the art are more effective techniques for generating graphics topologies in a graphics computing system.

SUMMARY

Various embodiments of the present disclosure set forth a computer-implemented method for generating a mesh topology in a computing system. The method includes generating, for each vertex in a plurality of vertices of a mesh, first indices for a first index buffer, where each element in the first index buffer corresponds to a unique position and set of attributes, and where multiple first indices for the first index buffer are generated for multiple vertices in parallel. The method further includes generating, for each vertex in the plurality of vertices of the mesh, second indices for a second index buffer, where each element in the second index buffer corresponds to a unique position, and where multiple second indices for the second index buffer are generated for multiple vertices in parallel. The method further includes generating, for each vertex represented in the second index buffer, a list of geometric primitives that are adjacent to the vertex. The method further includes generating an edge buffer, where each edge represented in the edge buffer corresponds to a unique edge of the mesh, and where the edge buffer is generated in parallel with the lists of geometric primitives. Topological data associated with the mesh includes one or more of the first index buffer, the second index buffer, the lists of geometric primitives, or the edge buffer.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a processor may perform more steps of the topology generation process in parallel, thereby taking advantage of the processing capabilities of parallel processing subsystems that include multiple parallel processing units. The disclosed techniques may thereby result in significant reduction of the time required by geometry processing for parallel generation of topological data on graphics hardware. As a result, mesh topologies are generated with decreased latency relative to prior conventional techniques. This decreased latency leads to higher computational performance relative to prior techniques. These advantages represent one or more technological improvements over prior art approaches.

BRIEF DESCRIPTION OF THE DRAWINGS

So that the manner in which the herein recited features of the various embodiments may be understood in detail, a more particular description of the inventive concepts, briefly summarized herein, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 8 is a flow diagram of method steps for generating topological data by the computing system of FIG. 1, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
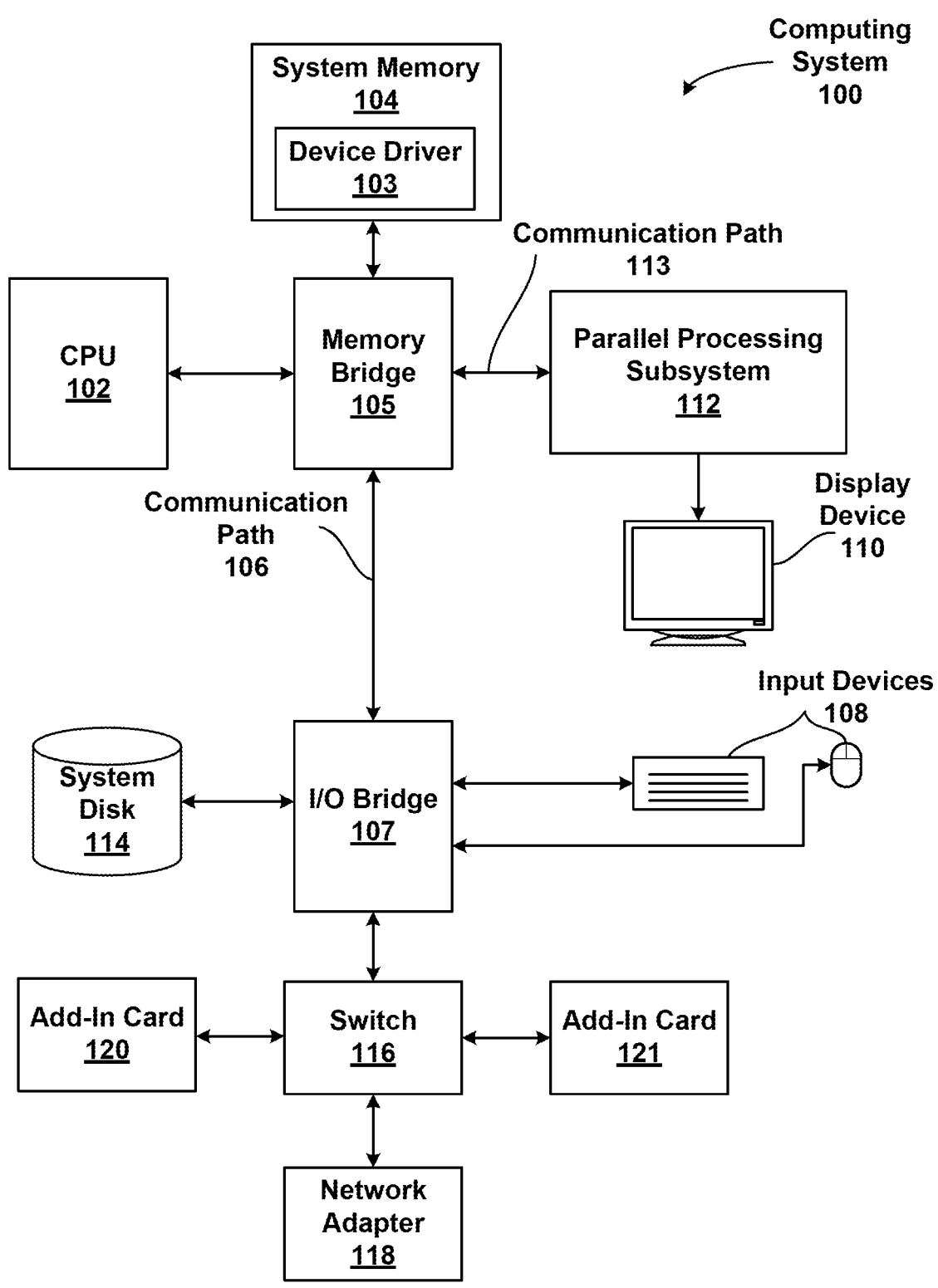
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some non-limiting examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some non-limiting examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and/or the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, without limitation, video output circuitry. As described in greater detail herein in FIG. 2, such circuitry may be incorporated across one or more parallel processors included within parallel processing subsystem 112. A parallel processor includes any one or more processing units that may execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, parallel processing subsystem 112 includes two processors, referred to herein as a primary processor (normally a CPU) and a secondary processor. In some embodiments, the primary processor is a CPU and the secondary processor is a GPU. Additionally or alternatively, each of the primary processor and/or the secondary processor may be any one or more of the types of parallel processors disclosed herein, in any technically feasible combination. The secondary processor receives secure commands from the primary processor via a communication path that is not secured. The secondary processor accesses a memory and/or other storage system, such as system memory 104, Compute eXpress Link (CXL) memory expanders, memory managed disk storage, on-chip memory, and/or the like. The secondary processor accesses this memory and/or other storage system across an insecure connection. The primary processor and/or the secondary processor may communicate with one another via a GPU-to-GPU communications channel, such as Nvidia Link (NV-Link). Further, the primary processor and/or the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the parallel processing subsystem 112 incorporates circuitry optimized for general purpose and/or compute processing. Again, such circuitry may be incorporated across one or more parallel processors included within parallel processing subsystem 112 that are configured to perform such general purpose and/or compute operations. In yet other embodiments, the one or more parallel processors included within parallel processing subsystem 112 may be configured to perform graphics processing, general purpose processing, and compute processing operations. System memory 104 includes at least one device driver 103 configured to manage the processing operations of the one or more parallel processors within parallel processing subsystem 112.

In various embodiments, parallel processing subsystem 112 may be integrated with one or more other the other elements of FIG. 1 to form a single system. For example, without limitation, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and/or the number of parallel processing subsystems 112, may be modified as desired. For example, without limitation, system memory 104 may be connected to CPU 102 directly rather than through memory bridge 105, and other devices may communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, without limitation, switch 116 may be eliminated, and network adapter 118 and add-in cards 120, 121 may connect directly to I/O bridge 107.

Figure 2:
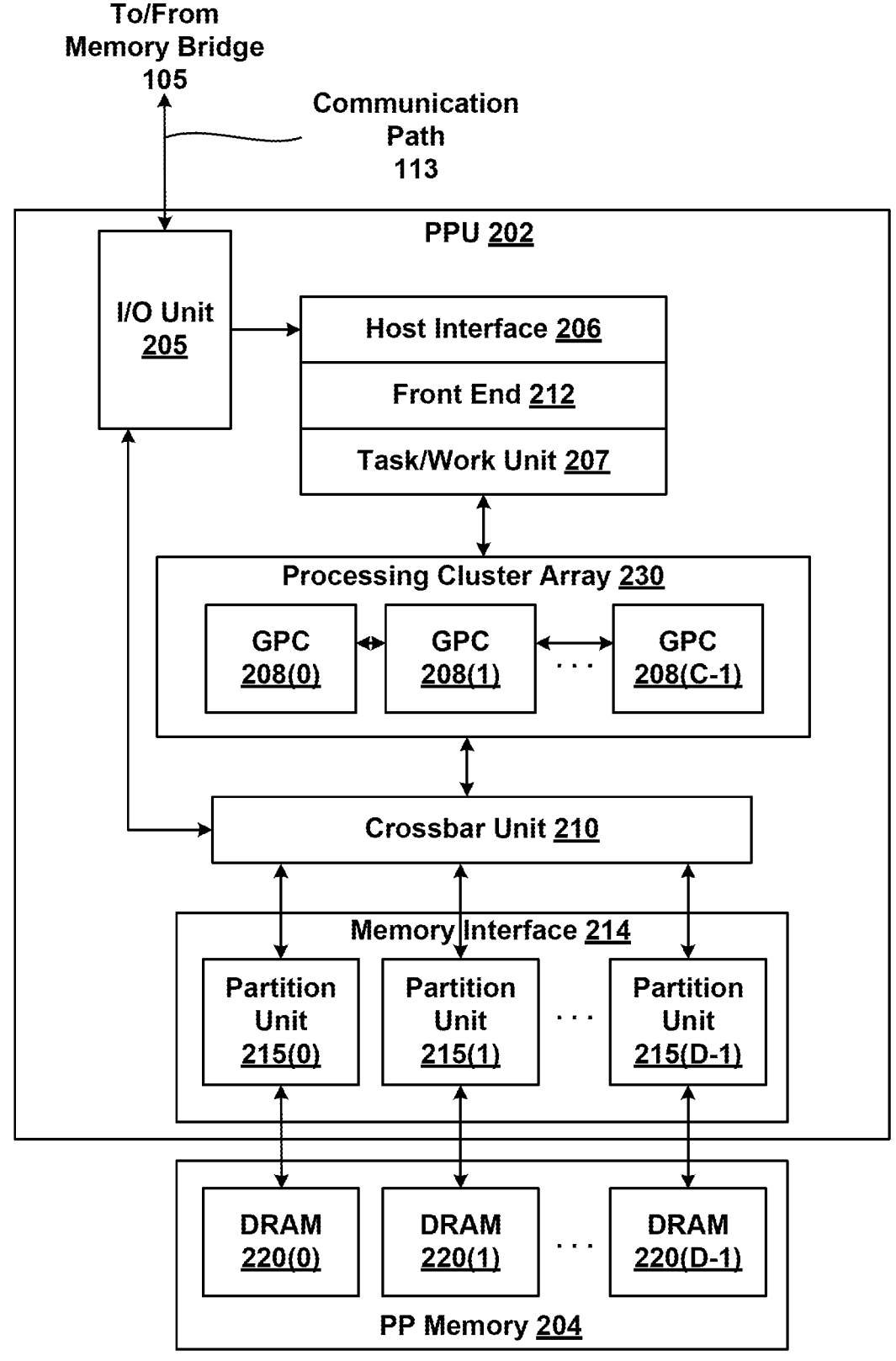
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated herein, parallel processing subsystem 112 may include any number of PPUs 202. Further, the PPU 202 of FIG. 2 is one non-limiting example of a parallel processor included in parallel processing subsystem 112 of FIG. 1. Alternative parallel processors include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of parallel processor(s) included within parallel processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 may be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or parallel processors other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, without limitation, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned herein in conjunction with FIG. 1, the connection of PPU 202 to the rest of computing system 100 may be varied. In some embodiments, parallel processing subsystem 112, which includes at least one PPU 202, is implemented as an add-in card that may be inserted into an expansion slot of computing system 100. In other embodiments, PPU 202 may be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, without limitation, the state parameters and commands may define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 may be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computing system 100.

As noted herein, any number of PPUs 202 may be included in a parallel processing subsystem 112. For example, without limitation, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, without limitation, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and/or the like.

Figure 3:
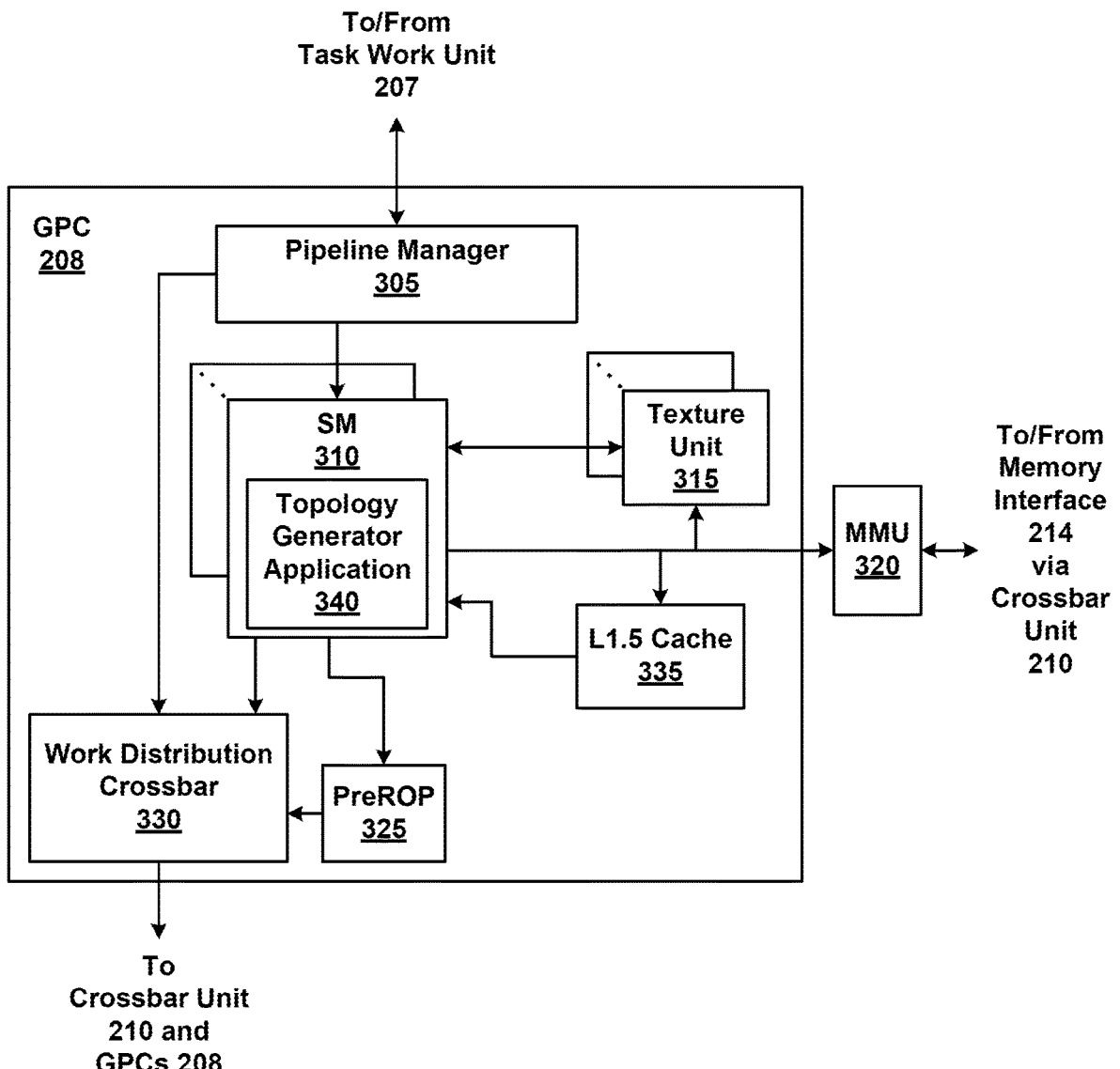
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit may be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 may support up to G thread groups concurrently, it follows that up to G*M thread groups may be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA)

programming language describes the behavior and operation of threads executing on GPC 208, including any of the herein-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

In addition, SM 310 includes a topology generator application 340 stored in a memory of SM 310. Topology generator application 340, when executed by SM 310, performs one or more operations associated with the techniques further described herein. When performing the operations associated with the disclosed techniques, topology generator application 340 stores data in and retrieves data from memory, such as a local memory shared by one or more SMs 310, a cache memory, parallel processing memory 204, system memory 104, and/or the like.

In operation, topology generator application 340 employs various data structures stored in memory when performing the operations described herein. These data structures store input data received by topology generator application 340, output data generated by topology generator application 340, store temporary data accessed by topology generator application 340 during execution, and/or the like. In some embodiments, the layout of data included in the data structures, the lifetime of the data structures, and/or the like may vary within the scope of the present disclosure. For example, without limitation, the hash indices described herein may be maintained during execution of topology generator application 340 as topology generator application 340 generates topological data for a mesh, and subsequently may be discarded.

Input data structures include an input mesh. The input mesh may be a two-dimensional (2D) mesh, a three-dimensional (3D) mesh, and/or the like. The input mesh includes $N_v$ input vertices and $N_p$ geometric primitives, such as triangles, quadrilaterals, and/or the like. Each of $N_p$ geometric primitives may be represented by a subset of the $N_v$ input vertices. For example, without limitation, a triangle may be represented by three input vertices, a quadrilateral may be represented by four input vertices, and so on. More generally, the disclosed techniques may be applied to meshes composed of any types of polygonal geometric primitives, in any combination, and may also encompass control grids of subdivision surfaces. The input vertices of the mesh may be represented by a buffer Pin that includes the vertex positions $v_p$, and a buffer $H_{in}$ that includes, for each input vertex, two distinct integer hash values $v_{a1}$ and $v_{a2}$ generated from one or more other vertex attributes, such as the color values of the input vertex, the normal vector of the input vertex, the texture coordinates of the input vertex, and/or the like.

The geometric primitives of the mesh are represented by an index buffer $I_{in}$ that includes a set of unsigned integer values (e.g., 32-bit unsigned integers) per geometric primitive, where each index corresponds to the vertex data stored at that index in Pin. In various embodiments, the geometric primitives are triangles and, therefore, each triangle is represented by three indices. For ease of discussion, the present disclosure describes techniques related to meshes composed of triangles. However, the disclosed techniques may be applied to meshes composed of any one or more types of geometric primitives. For example, without limitation, the disclosed techniques may be applied to a mesh composed of quadrilaterals where each quadrilateral is represented by four indices.

From the input data structures, topology generator application 340 generates output data structures that include topological data related to the mesh. This topological data may be used in subsequent computational geometry tasks. In some examples, a mesh may include multiple vertices located at the same position in space, either due to complete duplication or by the presence of discontinuities in other vertex attributes. In the case of complete duplication, multiple vertices existing at the same position may be part of different geometric primitives that share vertex attributes at the position. One non-limiting example is a set of vertices that meet at the same position within the interior of a face of a cube, where the vertices have the same color, the same normal vector, the same texture coordinates, etc. as one another. In the case of discontinuities, multiple vertices existing at the same position may nevertheless have different vertex attributes from one another. One non-limiting example is a set of vertices that meet at the same position at the corner of a cube where three faces of the cube meet at the corner. In this non-limiting example, the vertices have the same position but may have different normal vectors. Further, other vertex attributes, such as color values and texture coordinates, may be the same for the multiple vertices or may be different for the multiple vertices. To prepare the mesh for various computational geometry techniques, the disclosed techniques may generate topological data, such as connectivity of the input vertices, for a mesh whether the mesh includes multiple vertices located at the same position due to complete duplication and/or multiple vertices located at the same position with discontinuities in other vertex attributes. In this regard, topology generator application 340 generates a secondary index buffer $I_{out}$, where each distinct (32-bit unsigned integer) index included in the secondary index buffer $I_{out}$ corresponds to a unique position in space.

For each vertex v of the mesh, topology generator application 340 generates: (1) a flag $v_f$ of representing the status of the vertex v; (2) an index $v_i$ representing a triangle t included in secondary index buffer $I_{out}$ that references the vertex v; and (3) an integer hash index $v_h$ referencing an element in a hash map $H_{scratch}$. Topology generator application 340 stores this additional per-vertex data in a vertex buffer named $V_{out}$. The vertex buffer $V_{out}$ includes $N_v$ elements, which is the number of input vertices of the mesh.

The status flag $v_f$ representing the status of the vertex v combines one or more individual status conditions of the vertex v. In one or more embodiments, one status condition of the vertex v may be "unknown," indicating that topology generator application 340 has not yet determined the status of the vertex v. Another status condition of the vertex v may be "used," indicating that at least one triangle t references the vertex v. Yet another status condition of the vertex v may be "orphan," indicating that that no triangle t references the vertex v. Still another status condition of the vertex v may indicate that the vertex v is along a discontinuity. Yet another status condition of the vertex v may indicate that the vertex v is at the crossing of multiple discontinuities. Yet another status condition of the vertex v may indicate that the vertex v is adjacent to more than one discontinuity. A given vertex v may have any one or more of these status conditions in any combination. In some embodiments, the flag $v_f$ is represented using a bit field, such as an 8-bit unsigned integer.

Topology generator application 340 further generates primitive edges e for the geometric primitives included in the mesh. A primitive edge e is represented by two integer indices e1 and e2 referencing two vertices. Topology generator application 340 stores the primitive edges e in an edge buffer named $E_{out}$. The edge buffer $E_{out}$ is sized to include the largest number of possible edges in a worst-case scenario where all geometric primitives are disjoint and, therefore, all primitive edges e are likewise disjoint. Therefore, an edge buffer $E_{out}$ for a mesh that includes triangles is sized to store three edges per triangle, for a total of $3N_p$ elements. Similarly, an edge buffer $E_{out}$ for a mesh that includes quadrilaterals may be sized to store four edges per quadrilateral, for a total of $4N_p$ elements. Topology generator application 340 further generates and stores an integer value $N_e$ representing the number of unique primitive edges included in the mesh. In some examples, without limitation, topology generator application 340 generates an edge buffer $E_{out}$ of a smaller size than the worst-case scenario, where the size of the edge buffer $E_{out}$ is based on additional data determined from the input mesh.

In addition, for each triangle t of the mesh topology generator application 340 generates: (1) a vector $t_t$ of three integer values referencing another triangle adjacent to each vertex v of the triangle t, respectively; (2) a vector $t_e$ of three integer values referencing the edges e of the triangle t stored in the edge buffer $E_{out}$; and (3) a binary flag $t_f$ indicating whether the triangle t is degenerate or not. A triangle t is degenerate if the triangle t has a surface area of zero.

Topology generator application 340 stores this per-triangle data in a triangle buffer $T_{out}$. The triangle buffer $T_{out}$ includes $N_p$ elements, one element for each geometric primitive included in the mesh.

To generate topological data, topology generator application 340 generates certain temporary data structures. Topology generator application 340 stores data in and retrieves data from these temporary data structures. In this regard, topology generator application 340 generates a hash map $H_{scratch}$ that identifies unique values in a data set. Each element h in the hash map $H_{scratch}$ includes: (1) a checksum value $h_c$ used for collision mitigation; (2) a reference counter $h_r$ representing the number of input values corresponding to this unique element h; and (3) one integer payload index $h_i$.

Topology generator application 340 uses the hash map $H_{scratch}$ to identify unique vertices v and edges e. In some embodiments, for improved performance, topology generator application 340 generates and uses a hash map $H_{scratch}$ comprising twice the maximum number of unique entries. In this regard, topology generator application 340 may conservatively allocate the hash map $H_{scratch}$ with $6N_p$ entries for a mesh that has triangle geometric primitives. Similarly, topology generator application 340 may conservatively allocate the hash map $H_{scratch}$ with $8N_p$ entries for a mesh that has quadrilateral geometric primitives. Alternatively, topology generator application 340 may allocate the hash map $H_{scratch}$ with more entries or with fewer entries.

Before performing the disclosed techniques, topology generator application 340 initializes the described data structures to prepare those data structures for generating topological data for the mesh. For each vertex v of the mesh, topology generator application 340 initializes the per-vertex data in the vertex buffer $V_{out}$. For each vertex v, topology generator application 340 initializes the flag $v_f$ representing the status of the vertex v; to "unknown." For each vertex v, topology generator application 340 initializes the vertex index $v_i$ to a value representing a "NOT_FOUND" status. In some non-limiting examples, the vertex index $v_i$ is a 32-bit unsigned integer, and the value representing a "NOT_FOUND" status is where all 32 bits are set to 1, such that NOT_FOUND=4,294,967,295. Topology generator application 340 initializes the number of unique edges $N_e$ to 0. Topology generator application 340 may leave the contents of $E_{out}$ in an uninitialized state. Further, topology generator application 340 may leave the data for each additional triangle t in the triangle buffer $T_{out}$ in an uninitialized state. For the hash map $H_{scratch}$, topology generator application 340 initializes each element h in the hash map $H_{scratch}$ with a checksum value $h_c$ such that $h_c$=NOT_FOUND. Topology generator application 340 may leave the contents of the other components of the entries h in an uninitialized state. After initialization, topology generator application 340 generates topological data for the mesh by performing four operations, namely: (1) hashing; (2) deduplication; (3) generating adjacency lists; and (4) generating an edge list.

Topology generator application 340 performs a hashing operation in order to enforce the unicity of entries in various data structures described herein. Topology generator application 340 generates integer hash keys from multidimensional entries (such as a set of vertex attributes) by successively hashing each component of the vertex attributes. The vertex attributes may include the color values of the vertex, the normal vector of the vertex, the texture coordinates of the vertex, and/or the like. For example, without limitation, if a vertex contains n attributes $a_1$, $a_2$, $a_3$, . . . $a_n$, then topology generator application 340 may generate a vertex attribute hash value $v_a$ as shown in Equations 1-3:

$$v_a = F(n) \qquad\qquad (1)$$

$$F(n) = H(a_n + F(n-1)) \qquad\qquad (2)$$

$$F(1) = H(a_1) \qquad\qquad (3)$$

where $H(n)$ is any suitable hash function, such as a Wang hash function, an exclusive-or (XOR) shift hash function, and/or the like. Note that certain hash functions generally operate on integer values, whereas values for vertex attributes are represented, in some embodiments, by floating-point values. Even so, 32-bit unsigned integers contain the same number of bits as single precision floating-point values. Therefore, a hash function $H(n)$ suitable for 32-bit unsigned integer values may similarly perform a hash function on 32-bit binary representations of single-precision floating-point numbers without loss of generality.

Topology generator application 340 performs parallel hashing by generating two hash values for each tested input: one index i and one nonzero checksum value c. To add an element h to the hash map $H_{scratch}$, topology generator application 340 retrieves the checksum value $c_t$ located at the index i in the hash map $H_{scratch}$. If the retrieved checksum value $c_t = $NOT_FOUND, then topology generator application 340 allocates the index i for the corresponding element h to the hash map $H_{scratch}$ by replacing the checksum value $c_t$ in the element h with the generated checksum value c. Topology generator application 340 generates an indication that topology generator application 340 has made a new allocation. If the retrieved checksum value $c_t = $the generated checksum value c, then topology generator application 340 has previously generated the element h based on a prior input. Topology generator application 340 generates an indication that topology generator application 340 has identified a duplicate element h. If the retrieved checksum value $c_t$ is a value other than NOT_FOUND or the generated checksum value c, then topology generator application 340 has already used the index i for another distinct element h. Topology generator application 340 generates another alternative index $i_{alt}$ and performs the process again for the current input. In one non-limiting example, topology generator application 340 performs a hash function on the index i itself to generate the alternative index, such that $i_{alt} = H(i)$. After generating and/or updating the element h, topology generator application 340 returns a value $i_f = i$ representing the index in the hash map $H_{scratch}$ where topology generator application 340 generated or identified the corresponding element. To facilitate parallel execution, topology generator application 340 performs the two tests using a single atomic compare-exchange operation, resulting in efficient, non-locking execution.

Topology generator application 340 performs a deduplication operation to identify and remove duplicate vertices, where such duplicate vertices share position and other attributes. In order to generate accurate topological data, topology generator application 340 identifies and removes these duplicate vertices so that each vertex position $v_p$, vertex attribute $v_a$ pair $(v_p, v_a)$ referenced by the triangles t of the mesh is unique. For each input vertex v located at the index $i_v$ in the vertex buffer $V_{out}$, topology generator application 340 generates two hash values, i and c, representing the position of the vertex and the full attribute set of the vertex, by applying Equation 1 to a vector that includes the vertex position $v_p$ and vertex attributes $v_{a1}$, $v_{a2}$, respectively. Topology generator application 340 performs the hashing operation described herein to generate a final hash index $i_f$ that references an element h in the hash map $H_{scratch}$. If this element h has been newly generated, then topology generator application 340 sets the integer payload index $h_i = $the index $i_v$. In addition, topology generator application 340 sets vertex index $v_i = $the final hash index $i_f$.

For each triangle in the index buffer $I_{in}$, topology generator application 340 retrieves the three indices i0, i1, i2. Topology generator application 340 retrieves the vertex v0 referenced by index i0, retrieves the vertex index $v0_i$, and identifies the hash index $h0_i$ stored in the hash map $H_{scratch}$ at this index. If the hash index $h0_i \neq$the index i0, then topology generator application 340 sets the index i0 in the index buffer $I_{in} = $the hash index $h0_i$. Topology generator application 340 applies the same process to the other indices i1 and i2. If the three indices i0, i1, i2 are not distinct from one another, then topology generator application 340 identifies the triangle as degenerate and the triangle is not considered in further processes. Otherwise, if the three indices i0, i1, i2 are distinct from one another, then topology generator application 340 identifies the triangle as valid. Topology generator application 340 also modifies the corresponding status flags $v0_f$, $v1_f$, and $v2_f$ for the three vertices of the triangle to add the "used" status and remove the "unknown" status.

For any vertex with a status flag $v_f$ that still includes the "unknown" flag, topology generator application 340 modifies the status flag $v_f$ to add the "orphan" status, and the triangle is not considered in further processes. Topology generator application 340 also clears the hash map $H_{scratch}$ by setting the checksum value $h_c = $NOT_FOUND, the reference counter $h_r = 0$ and the integer payload index $h_i = 0$ for each element of the hash map $H_{scratch}$. The resulting mesh now includes only distinct vertices.

However, for some computational geometry applications, topology generator application 340 further identifies which vertices are connected, regardless of the attributes of the vertices. The process to identify vertices at each unique position, regardless of the vertex attributes, is similar to the technique for identifying duplicate vertices (including duplicate vertex attributes). As described herein, topology generator application 340 initializes each element h in the hash map Hscratch with a checksum value hc such that hc=NOT_FOUND. However, to identify vertices at each unique position, topology generator application 340 generates the per-vertex hash values i and c solely from the vertex position $v_p$. If topology generator application 340 generates a new element h in the hash map $H_{scratch}$ for a vertex v at index $i_v$, then topology generator application 340 sets the integer payload index $h_i = $the index $i_v$. In addition, topology generator application 340 increments the reference counter $h_r$ and sets the vertex index $v_i = $the final hash index $i_f$. As a result, an element with a reference counter $h_r > 1$ indicates that several vertices with distinct attributes are present at that position, which is characteristic of an attribute discontinuity in the mesh at that position.

For each triangle in the index buffer $I_{in}$, topology generator application 340 retrieves the three indices i0, i1, i2 of the triangle. Topology generator application 340 retrieves the vertex v0 referenced by index i0, retrieves the vertex index $v0_i$, identifies the hash index $h0_i$ stored in the hash map $H_{scratch}$ at this index. If the hash index $h0_i \neq$the index i0, then topology generator application 340 set the index i0 in the secondary index buffer $I_{out}$ to equal the hash index $h0_i$. If the reference counter $h0_r = 2$, then two vertices with distinct attributes are present at that position. Topology generator application 340 identifies vertex v0 as being positioned along a discontinuity line by setting the status flag $v0_f$ accordingly. If the reference counter $h0_r > 2$, then the vertex topology generator application 340 setting the status flag $v0_f$ to indicate that the vertex is located at the intersection of two or more discontinuity lines. Topology generator application 340 applies the same process to the other indices i1 and i2. If the status flag $v_f$ for all three vertices are marked as being on one or more discontinuities, then topology generator application 340 modifies the status flag $v_f$ for all three vertices to identify the vertices as adjacent to multiple discontinuities.

To facilitate parallel execution, topology generator application 340 modifies the status flags $v_f$ for the three vertices atomically. At the end of this process, the secondary index buffer $I_{out}$ defines a mesh where each referenced vertex has a unique position, and discontinuities are identified at the vertex level.

Topology generator application 340 generates adjacency lists, where each adjacency list identifies the triangles t connected to a particular vertex v. For each triangle t at index $i_t$ defined by three indices in secondary index buffer $I_{out}$, topology generator application 340 retrieves a first vertex v0. Topology generator application 340 sets the index for the first vertex v0 in the triangle index $t_i[0]$=the vertex index $v0_i$. Topology generator application 340 further sets the vertex index $v0_i$=index $i_t$. To facilitate parallel execution, topology generator application 340 bundles and performs these two operations as a single atomic exchange operation. Topology generator application 340 applies the same process to the other indices other vertices v1 and v2.

In a particular non-limiting example, a triangle fan is generated around a vertex v, and topology generator application 340 processes the triangles of the triangle fan sequentially. After the initialization process described herein, each vertex index $v_i$=NOT_FOUND. Topology generator application 340 references each triangle through the first vertex v0 of the triangle. Topology generator application 340 processes a first triangle of the triangle fan at index $i0_t$ by setting triangle index $t0_i[0]$=NOT_FOUND and setting vertex index $v_i$=index $i0_t$. Topology generator application 340 processes a second triangle of the triangle fan at index $i1_t$ by setting triangle index $t1_i[0]$=index $i0_t$ and setting vertex index $v_i$=index $i1_t$. Topology generator application 340 processes a third triangle of the triangle fan at index $i2_t$ by setting triangle index $t2_i[0]$=index $i1_t$ and setting vertex index $v_i$=index $i2_t$, and so on. The vertex index $v_i$ then corresponds to the index of the last triangle of the triangle fan referencing v. Each triangle then references the previous triangle, providing a linked list of all the triangles connected to that vertex v.

Topology generator application 340 performs an edge list generation operation to generate a list of unique edges in a fashion similar to the vertex deduplication operation. For each triangle t defined by three corresponding indices in the secondary index buffer $I_{out}$, topology generator application 340 retrieves the indices i0, i1, i2 of the three vertices, and generates three edges as shown in Equations 4-6 as follows:

$$e0=(\min(i0,i1),\max(i0,i1)) \tag{4}$$

$$e1=(\min(i0,i2),\max(i0,i2)) \tag{5}$$

$$e2=(\min(i1,i2),\max(i1,i2)) \tag{5}$$

where the min functions and max functions shown in Equations 4-6 are optional, and are present to ensure independence on triangle winding. Alternatively, in some embodiments, the min functions and max functions may be eliminated and/or replaced with other suitable functions. Topology generator application 340 performs the hashing operation described herein to identify unique edges. For the edge e0, topology generator application 340 computes two hash values i and c representing the vertex indices of the edge e0 by using Equation 1. Topology generator application 340 performs the hashing operation to obtain a final hash index $i_f$, where the final hash index $i_f$ references an element h in the hash map $H_{scratch}$. If this element h is newly created, topology generator application 340 allocates an element at index $i_e$ in the edge list $E_{out}$, and stores the vertex indices as well as $i_f$ in that element in the edge list $E_{out}$. Topology generator application 340 sets the integer payload index $h_i$=index $i_e$. In addition, topology generator application 340 sets the triangle index $t_e[0]$=$i_f$, and increments the reference counter $h_r$ for that element. Topology generator application 340 repeats the same process for edges e1 and e2 to set the triangle indices $t_e[1]$ and $t_e[2]$, respectively. To facilitate parallel execution, topology generator application 340 performs the element allocation by atomically incrementing the edge counter $N_e$.

For each triangle t defined by its indices in $I_{out}$, topology generator application 340 retrieves and/or reconstruct the edges e0, e1, e2 described herein. For the edge e0, topology generator application 340 retrieves the corresponding hash index stored in the triangle index $t_e[0]$, and retrieves the corresponding hash map element h at triangle index $t_e[0]$. Topology generator application 340 replaces the edge index of the triangle $t_e[0]$ by the actual unique edge index $h_i$. Topology generator application 340 repeats the same process for edges e1 and e2 to set the triangle indices $t_e[1]$ and $t_e[2]$, respectively.

At the completion of execution of these operations, each triangle is linked to the neighboring geometry of the triangle, along with identifiers that identify discontinuities. One or more of the techniques described herein may be partially or fully performed in parallel. Therefore, the disclosed techniques are particularly suitable for execution on highly parallel computing systems, such as parallel processing subsystem 112.

It will be appreciated that the core architecture described herein is illustrative and that variations and modifications are possible. Among other things, the techniques described herein assume that multiple vertices that meet at a given position have exactly matching position data for the purpose of deduplication. However, in some embodiments, a mesh may have imperfections such that vertices meeting at the same position have coordinates that are not exactly equal. In that regard, the coordinates for one vertex at the position may differ from the coordinates for another vertex at the same position by one or more least significant bits (LSBs) of the floating-point mantissa included in the position. As a result, hashing the two sets of coordinates may result in a reference to two different positions in the index buffer. In such cases, topology generator application 340 modifies the hash function to use discretized ranges of values rather than exact values to determine the hash values. As a result, this modified hash function essentially performs approximate vertex welding for meshes that have minor imperfections.

In addition, any number of processing units, such as SMs 310, texture units 315, or preROP units 325, may be included within GPC 208. Further, as described herein in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, system memory 104, and/or the like. Please also note, as used herein, references to cache memory may include any one or more technically feasible memories, including, without limitation, an L1 cache, an L1.5 cache, and/or the L2 caches.

Generating Mesh Topology

Various embodiments include techniques for generating topological data of meshes via parallel execution on graphics hardware. The techniques perform topology generation in a series of (e.g., four) processes, where each process is suitable for execution on a processing unit with multiple parallel processors, such as a GPU. A first process hashes (e.g., applies a hash function to) each component (such as position, color, normal vector, etc.) of a vertex in the mesh. The first process generates two hash values for each vertex: an index into a hash table and a checksum to store in the hash table. The process generates two hash values in parallel and performs a pair of tests in parallel, resulting in efficient execution on a parallel processor. A second process performs deduplication, which removes duplicate vertices in the mesh. For example, without limitation, two triangles that abut along a common edge may share two vertices. Each of the two vertices may appear twice in the mesh, one for each triangle, and have identical attributes. The topology generator processes the three vertices of each triangle in parallel to find and remove such duplicate vertices from the mesh. A third process generates an adjacency list that identifies groups of multiple triangles that meet at a single vertex. This process involves a pair of operations that may be performed in parallel. A fourth process generates a list of unique edges in a fashion similar to the third process that performs vertex deduplication. This process includes an element allocation process that may be performed efficiently in parallel. Each of the four processes may be fully performed in parallel. The processes are, therefore, particularly suitable for execution on graphics hardware or other highly parallel processing systems.

As described herein, this topological data may be used in subsequent computational geometry tasks. In some examples, these computational geometry tasks may include edge decimation, where a large mesh with fine resolution is reduced to a simpler mesh for certain applications. In the video animation context, a high-resolution mesh may be used when an animated character is near to the front of a viewing surface, such as near the screen during an animated film or near to the point of view of a player of a video game. However, this high-resolution mesh is not necessary when the animated character is at a medium range or far away from the viewer. In such cases, the mesh may be simplified to a lower resolution. For example, without limitation, a high-resolution mesh containing 35 million triangles may be used when an animated character is near to the front of a viewing surface, and a low-resolution mesh containing 30,000 triangles may be used when an animated character is far away.

In some examples, the topological data that is generated using the disclosed techniques may be used to train a neural network that processes computer graphics objects, computer graphics set designs, three-dimensional images, or the like. Training of a neural network may be more efficient, more accurate, or otherwise more performant when the neural network is trained using the topological data generated by the disclosed techniques relative to the raw topological data from the input.

Figure 4A:
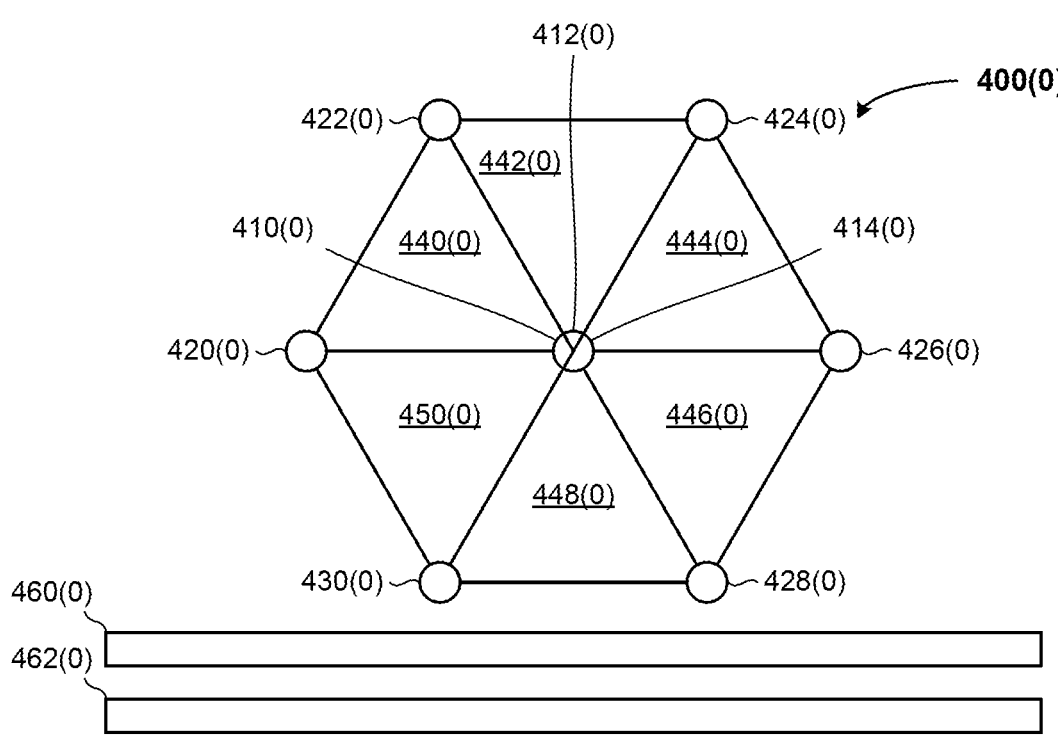
FIGS. 4A-4F illustrate an example process for performing deduplication of identical vertices at the same position, according to various embodiments.

FIGS. 4A-4F illustrate an example process for performing deduplication of identical vertices at the same position, according to various embodiments. As shown in FIG. 4A, a mesh 400(0) includes six triangles in the form of a triangle fan. The mesh 400(0) may be a portion of a larger mesh (not shown). The triangles of the mesh 400(0) share certain common vertices, where these common vertices are versions of the same vertex with the same position, same color, same normal vector, and/or other attributes. Each of vertices 420(0), 422(0), 424(0), 426(0), 428(0), and 430(0) appears once in the mesh 400(0) and is shared between two triangles of the mesh 400(0). Vertex 420(0) is shared between triangles 450(0) and 440(0). Vertex 422(0) is shared between triangles 440(0) and 442(0). Vertex 424(0) is shared between triangles 442(0) and 444(0). Vertex 426(0) is shared between triangles 444(0) and 446(0). Vertex 428(0) is shared between triangles 446(0) and 448(0). Vertex 430(0) is shared between triangles 448(0) and 450(0). Three vertices 410(0), 412(0), and 414(0) are at the same position and have the same attributes. Vertex 410(0) is shared between triangles 450(0) and 440(0). Vertex 412(0) is associated with a single triangle 442(0). Vertex 414(0) is shared among triangles 446(0), 446(0), and 448(0). As described herein, topology generator application 340 generates a hash map 460(0) and an index buffer 462(0). Topology generator application 340 uses the hash map 460(0) and the index buffer 462(0) to identify and eliminate duplicate identical vertices.

Figure 4B:
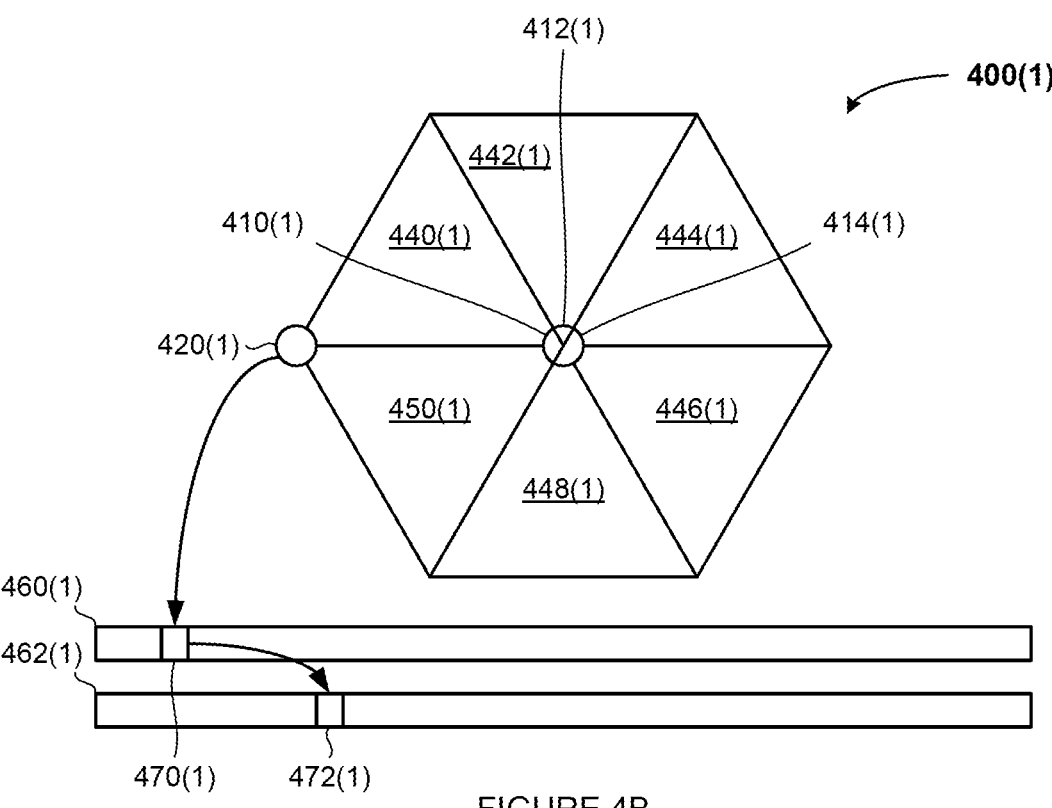

As shown in FIG. 4B, topology generator application 340 processes vertex 420(1) of the mesh 400(1) by generating two hash values for vertex 420(1): a first hash value representing the position of vertex 420(1) and a second hash value representing the other attributes of vertex 420(1). From these two hash values, topology generator application 340 generates an additional final hash value for vertex 420(1) representing the position of an element 470(1) in the hash map 460(1) corresponding to vertex 420(1). Because element 470(1) is newly generated, topology generator application 340 stores an index in element 470(1) that points to the data for vertex 420(1) stored in element 472(1) of the index buffer 462(1).

Figures 4C, 4D:
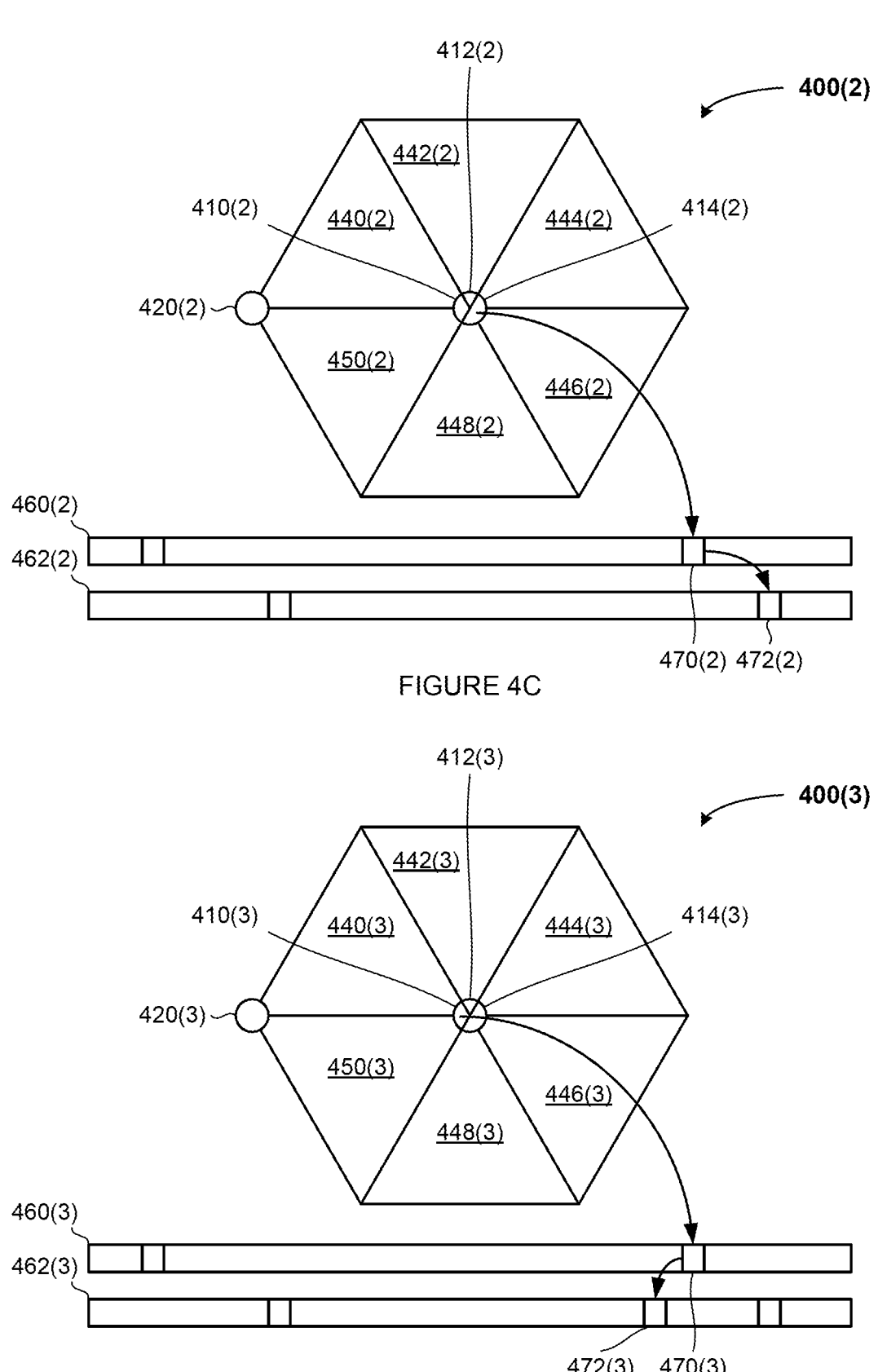

As shown in FIG. 4C, topology generator application 340 processes vertex 414(2) of the mesh 400(2) by generating two hash values for vertex 414(2): a first hash value representing the position of vertex 414(2) and a second hash value representing the other attributes of vertex 414(2). From these two hash values, topology generator application 340 generates an additional final hash value for vertex 414(2) representing the position of an element 470(2) in the hash map 460(2) corresponding to vertex 414(2). Because element 470(2) is newly generated, topology generator application 340 stores an index in element 470(2) that points to the data for vertex 414(2) stored in element 472(2) of the index buffer 462(2).

As shown in FIG. 4D, topology generator application 340 processes vertex 410(3) of the mesh 400(3) by generating two hash values for vertex 410(3): a first hash value representing the position of vertex 410(3) and a second hash value representing the other attributes of vertex 410(3). From these two hash values, topology generator application 340 generates an additional final hash value for vertex 410(3) representing the position of an element 470(3) in the hash map 460(3) corresponding to vertex 410(3). Because element 470(3) was previously generated when processing vertex 414(3), topology generator application 340 stores an indicator in element 470(3) that a duplicate has been found. Topology generator application 340 stores an index in element 470(3) that points to the data for vertex 410(3) stored in element 472(3) of the index buffer 462(3).

Figures 4E, 4F:
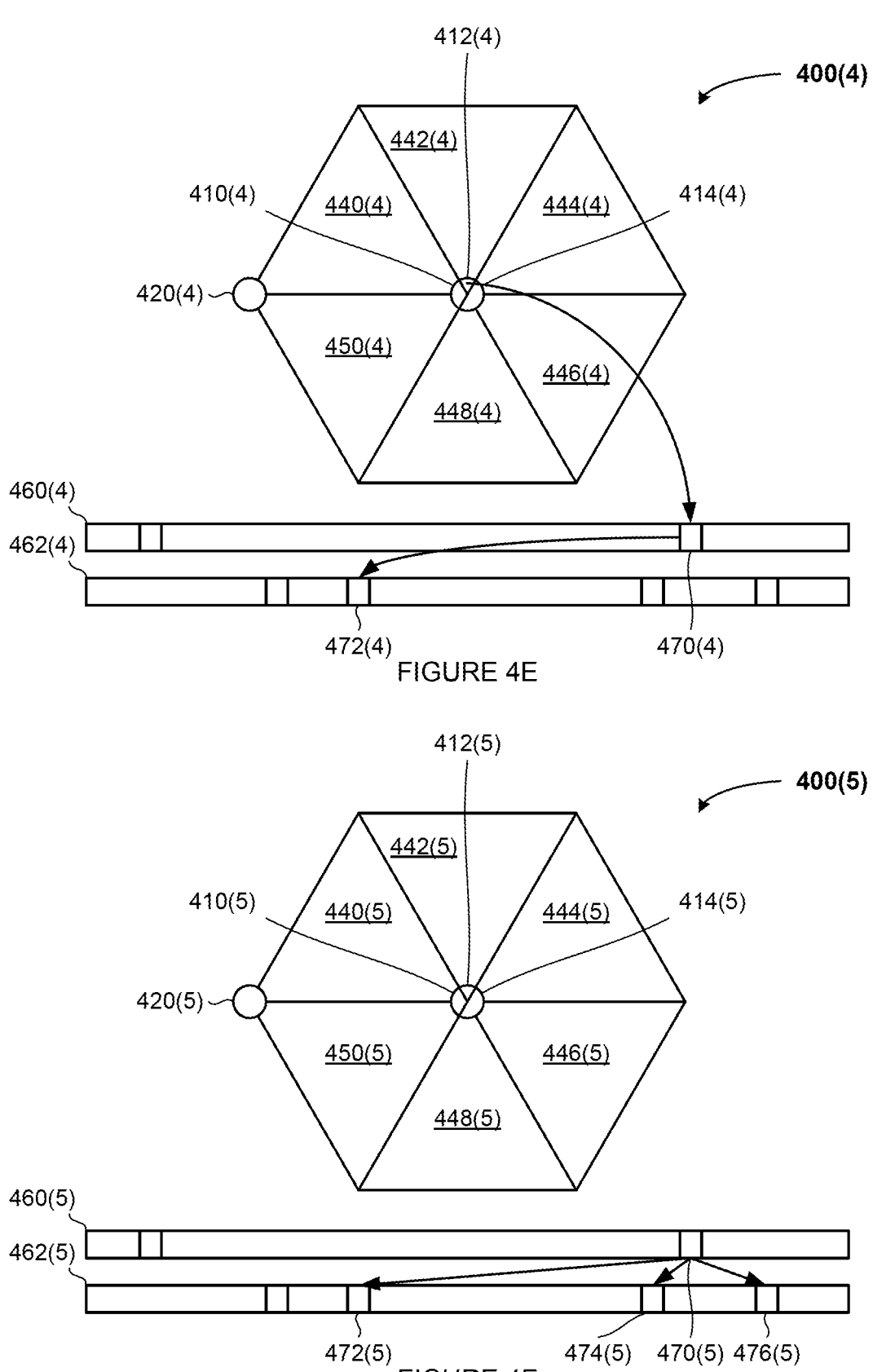

As shown in FIG. 4E, topology generator application 340 processes vertex 412(4) of the mesh 400(4) by generating two hash values for vertex 412(4): a first hash value representing the position of vertex 412(4) and a second hash value representing the other attributes of vertex 412(4). From these two hash values, topology generator application 340 generates an additional final hash value for vertex 412(4) representing the position of an element 470(4) in the hash map 460(4) corresponding to vertex 412(4). Because element 470(4) was previously generated when processing vertex 414(4), topology generator application 340 stores an indicator in element 770(4) that another duplicate has been found. Topology generator application 340 stores an index in element 470(4) that points to the data for vertex 412(4) stored in element 472(4) of the index buffer 462(4).

As shown in FIG. 4F, a single element 470(5) in the hash map 460(5) is referenced by three vertices 410(5), 412(5), and 414(5) that have identical positions and attributes. As a result, element 470(5) in the hash map 460(5) points to the data for vertex 412(5) stored in element 472(5) of the index buffer 462(5). Element 470(5) in the hash map 460(5) also points to the data for vertex 410(5) stored in element 474(5) of the index buffer 462(5). Element 470(5) in the hash map 460(5) also points to the data for vertex 414(5) stored in element 476(5) of the index buffer 462(5). After processing all of the vertices of the mesh 400(5), the index buffer 462(5) defines a mesh 400(5) where each vertex is distinct from the other vertices in the mesh 400(5).

Figure 5A:
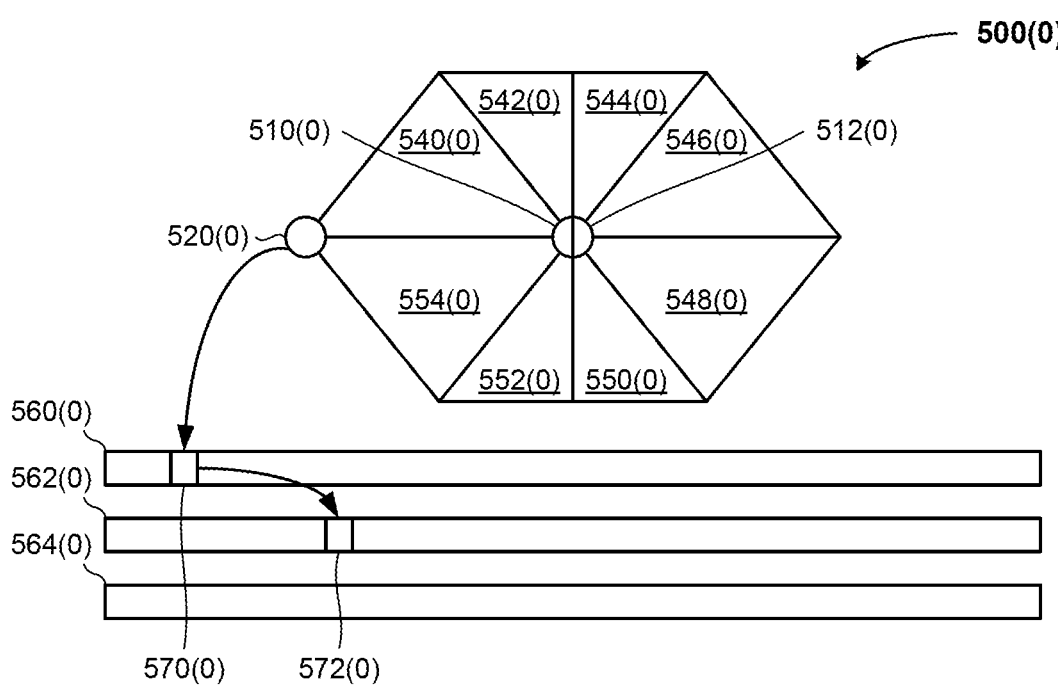
FIGS. 5A-5D illustrate deduplication of nonidentical vertices at the same position, according to various embodiments.

FIGS. 5A-5D illustrate deduplication of nonidentical vertices at the same position, according to various embodiments. As shown in FIG. 5A, a mesh 500(0) includes eight triangles in the form of a triangle fan. The mesh 500(0) may be a portion of a larger mesh (not shown). The triangles of the mesh 500(0) share certain common vertices, where these common vertices are versions of the same vertex with the same position, but which differ in one or more of color values, normal vector, and/or other attributes. Vertex 520(0) appears once in the mesh 500(0) and is shared between triangles 540(0) and 552(2) of the mesh 400(0). Two vertices 510(0) and 512(0) are at the same position but differ in one or more of color values, normal vector, and/or other attributes. Vertex 510(0) is shared among triangles 540(0), 542(0), 552(0), and 554(0) and have the same attributes as one another. Vertex 512(0) is shared among triangles 544(0), 546(0), 548(0), and 550(0) and have the same attributes as one another. As described herein, topology generator application 340 generates a hash map 560(0), an index buffer 562(0), and a position index buffer 564(0). Topology generator application 340 uses the hash map 560(0), index buffer 562(0), and position index buffer 564(0) to identify and eliminate vertices with identical positions.

Topology generator application 340 processes vertex 520 (0) of the mesh 500(0) by generating two hash values for vertex 520(0) based on the position of vertex 520(0). From these two hash values, topology generator application 340 generates an additional final hash value for vertex 520(0) representing the position of an element 570(0) in the hash map 560(0) corresponding to vertex 520(0). Because element 570(0) is newly generated, topology generator application 340 stores an index in element 570(0) that points to the data for vertex 520(0) stored in element 572(0) of the index buffer 562(0).

Figure 5B:
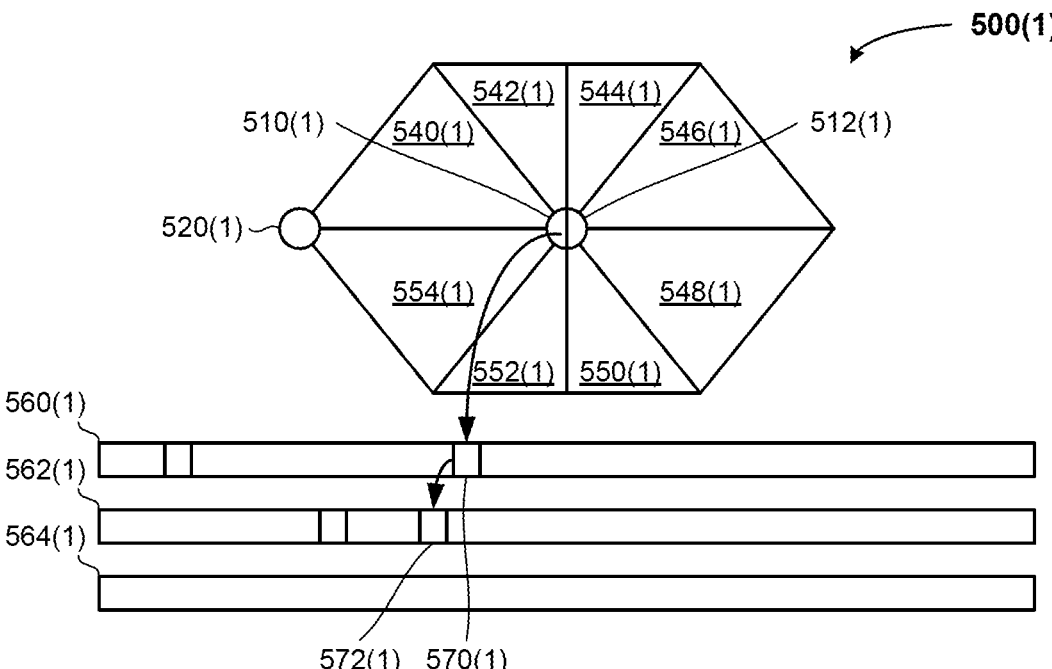

As shown in FIG. 5B, topology generator application 340 processes vertex 510(1) of the mesh 500(1) by generating two hash values for vertex 510(1): a first hash value representing the position of vertex 510(1) and a second hash value representing the other attributes of vertex 510(1). From these two hash values, topology generator application 340 generates an additional final hash value for vertex 510(1) representing the position of an element 570(1) in the hash map 560(1) corresponding to vertex 510(1). Because element 570(1) is newly generated, topology generator application 340 stores an index in element 570(1) that points to the data for vertex 510(1) stored in element 572(1) of the index buffer 562(1).

Figure 5C:
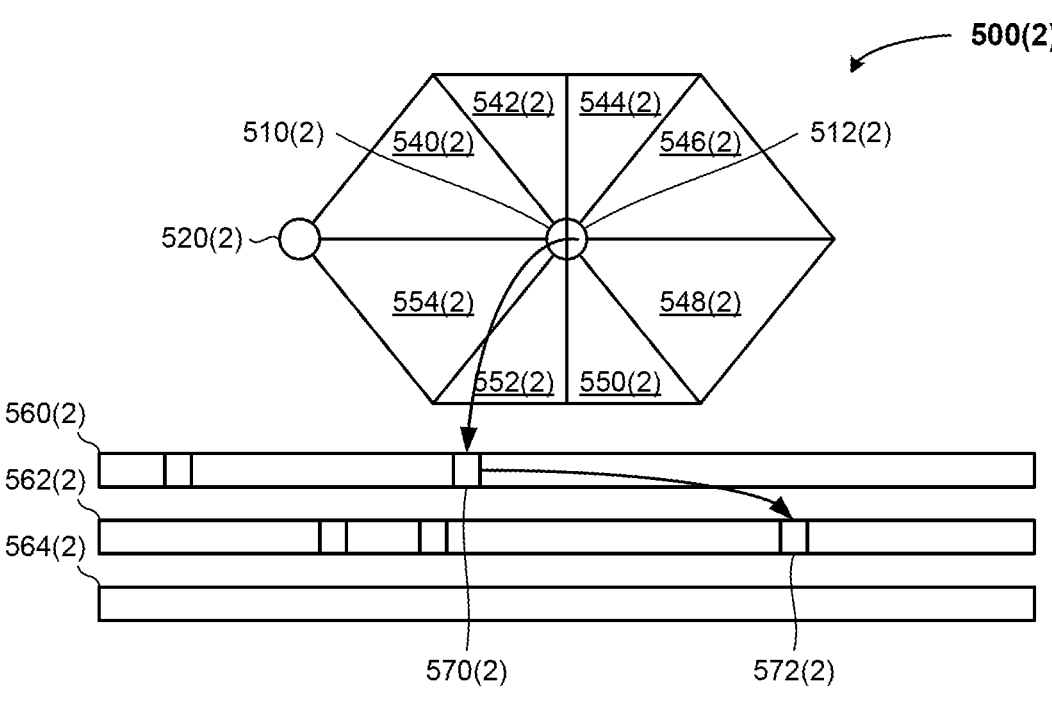

As shown in FIG. 5C, topology generator application 340 processes vertex 512(2) of the mesh 500(2) by generating two hash values for vertex 512(2): a first hash value representing the position of vertex 512(2) and a second hash value representing the other attributes of vertex 512(2). From these two hash values, topology generator application 340 generates an additional final hash value for vertex 512(2) representing the position of an element 570(2) in the hash map 560(2) corresponding to vertex 512(2). Because element 570(2) was previously generated when processing vertex 510(2), topology generator application 340 stores an indicator in element 570(2) that a duplicate has been found. Topology generator application 340 stores an index in element 570(2) that points to the data for vertex 512(2) stored in element 572(2) of the index buffer 562(2).

Figure 5D:
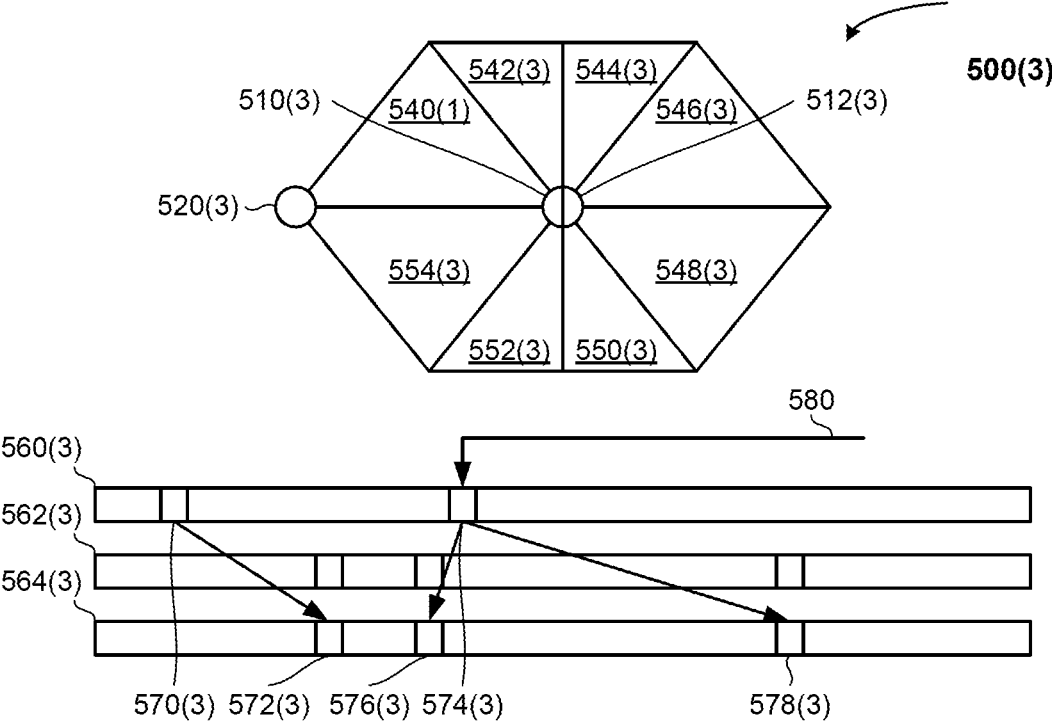

As shown in FIG. 5D, topology generator application 340 additionally generates and stores indices in the entries of the hash map that point to the data stored in position index buffer 564(3) for vertices with distinct position and other attributes. Because no other vertex shares a position with vertex 520(3), the element 570(3) in the hash map 560(3) points to the data for vertex 520(3) stored in a single element 572(3) of the position index buffer 564(3). Vertex 510(3) and vertex 512(3) share a position. Therefore, vertex 510(3) and vertex 512(3) share a single element 574(3) in the hash map 560(3). The element 574(3) in the hash map 560(3) points to two separate entries in the position index buffer 564(3). The element 574(3) points to the data for vertex 510(3) stored in 576(3) of the position index buffer 564(3). The element 574(3) also points to the data for vertex 512(3) stored in 578(3) of the position index buffer 564(3). Because the element 574(3) in the hash map 560(3) points to multiple separate entries in the position index buffer 564(3), topology generator application 340 generates an indicator 580 that identifies the vertices 510(3) and 512(3) as being positioned along a discontinuity. After processing all of the vertices of the mesh 500(3), the index buffer 562(3) and the position index buffer 564(3) define a mesh where each referenced vertex has a unique position, and discontinuities are identified at the vertex level.

Figure 6A:
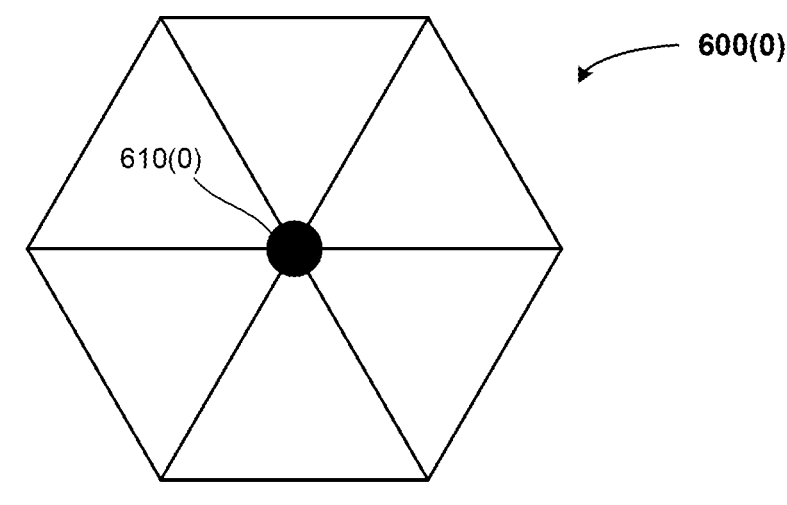
FIGS. 6A-6F illustrate generating an adjacency list, according to various embodiments.
Figure 6B:
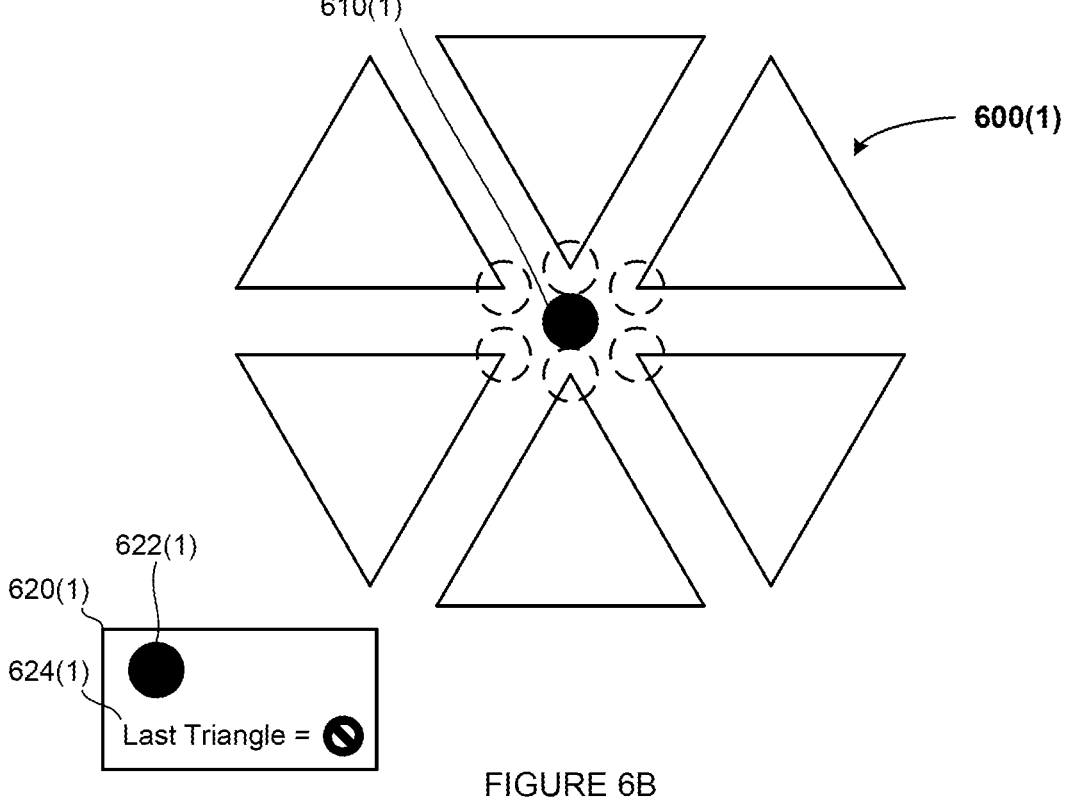

FIGS. 6A-6F illustrate generating an adjacency list, according to various embodiments. As shown in FIG. 6A, a mesh 600(0) includes six triangles in the form of a triangle fan. The mesh 600(0) may be a portion of a larger mesh (not shown). The six triangles of the mesh 600(0) meet at vertex 610(0). FIG. 6B shows an exploded view of the mesh 600(1), including the six triangles that are adjacent to vertex 610(1). Topology generator application 340 initializes a linked list 620(1) for vertex 610(1) with an identifier 622(1) that identifies vertex 610(1). Topology generator application 340 further initializes the linked list 620(1) for vertex 610(1)

with a last triangle pointer 624(1) that is set to a null pointer, indicating that the linked list 620(1) does not point to any triangles.

Figure 6C:
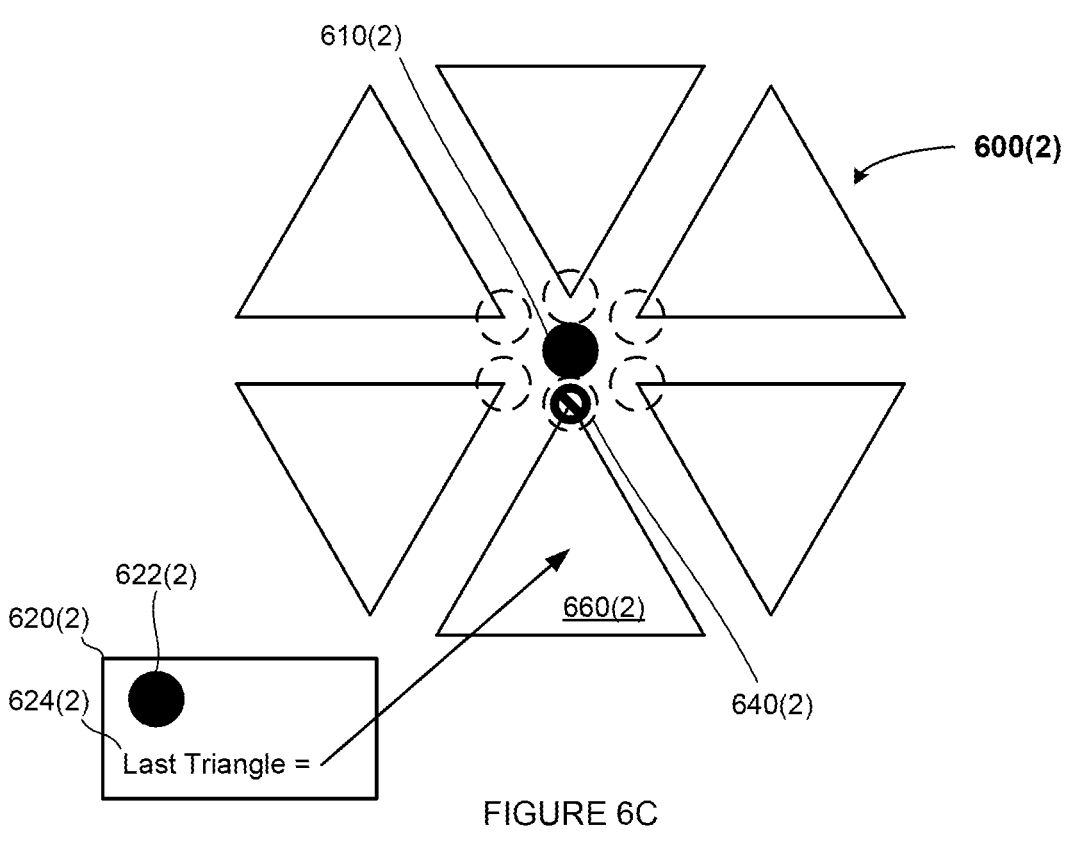

As shown in FIG. 6C, topology generator application 340 determines that triangle 660(2) is adjacent to vertex 610(2), which maps to vertex 640(2) of triangle 660(2). Topology generator application 340 updates the last triangle pointer 624(2) to point to triangle 660(2). Topology generator application 340 sets a pointer associated with vertex 640(2) of triangle 660(2) to a null pointer, indicating that triangle 660(2) is the terminal triangle in the linked list 620(2).

Figure 6D:
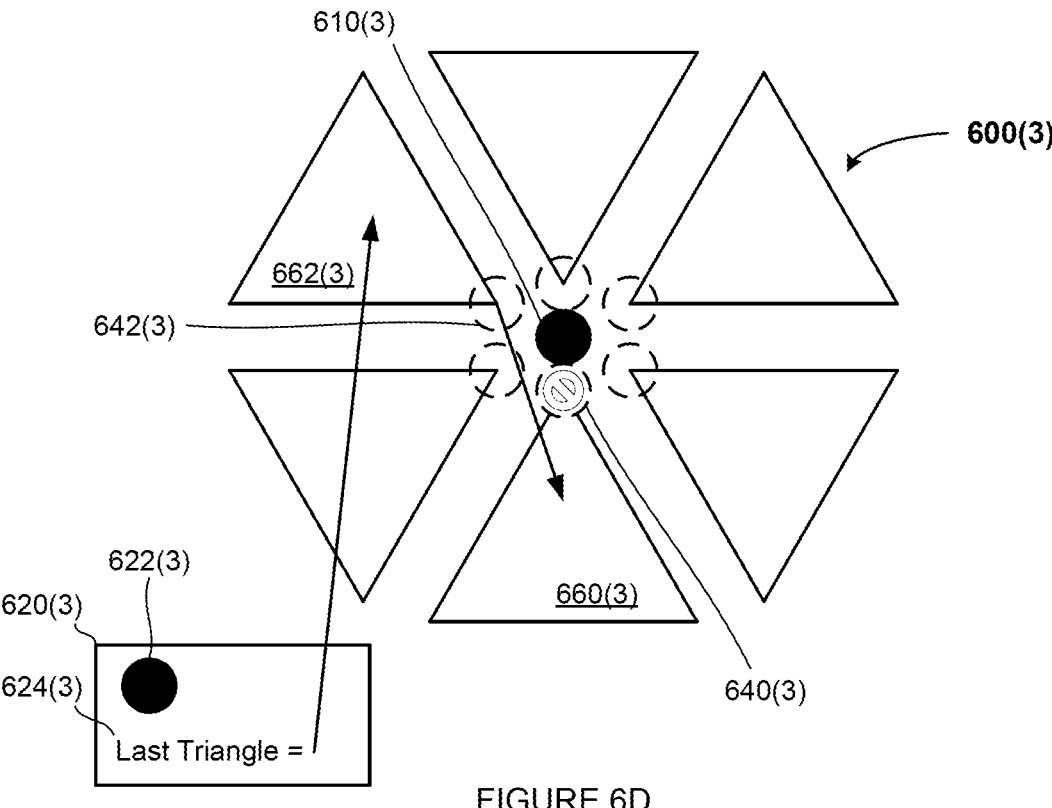

As shown in FIG. 6D, topology generator application 340 determines that triangle 662(3) is also adjacent to vertex 610(3) which maps to vertex 642(3) of triangle 662(3). Topology generator application 340 updates the last triangle pointer 624(3) to point to triangle 662(3). Topology generator application 340 sets a pointer associated with vertex 642(3) of triangle 662(3) to point to triangle 660(3). The pointer associated with vertex 640(3) of triangle 660(3) remains set to a null pointer, indicating that triangle 660(3) is the terminal triangle in the linked list 620(3).

Figure 6E:
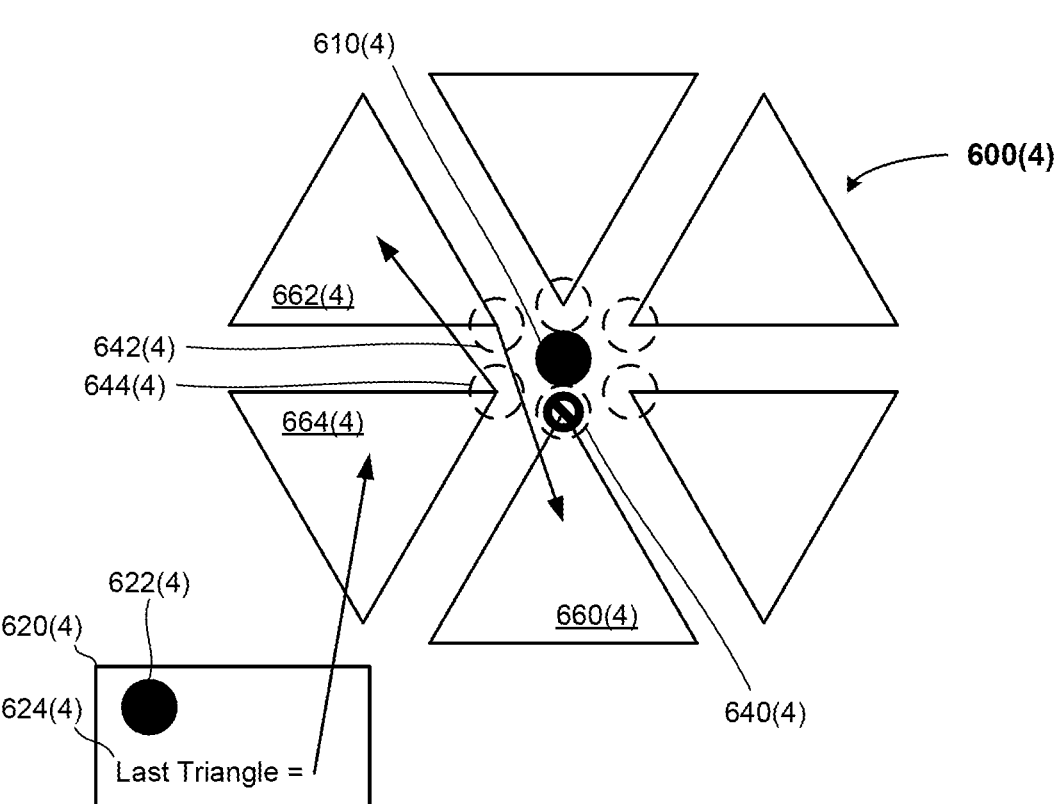

As shown in FIG. 6E, topology generator application 340 determines that triangle 664(4) is also adjacent to vertex 610(4) which maps to vertex 644(4) of triangle 664(4). Topology generator application 340 updates the last triangle pointer 624(4) to point to triangle 664(4). Topology generator application 340 sets a pointer associated with vertex 644(4) of triangle 664(4) to point to triangle 662(4). The pointer associated with vertex 642(4) of triangle 662(4) continues to point to triangle 660(4). The pointer associated with vertex 640(4) of triangle 660(4) remains set to a null pointer, indicating that triangle 660(4) is the terminal triangle in the linked list 620(4).

Figure 6F:
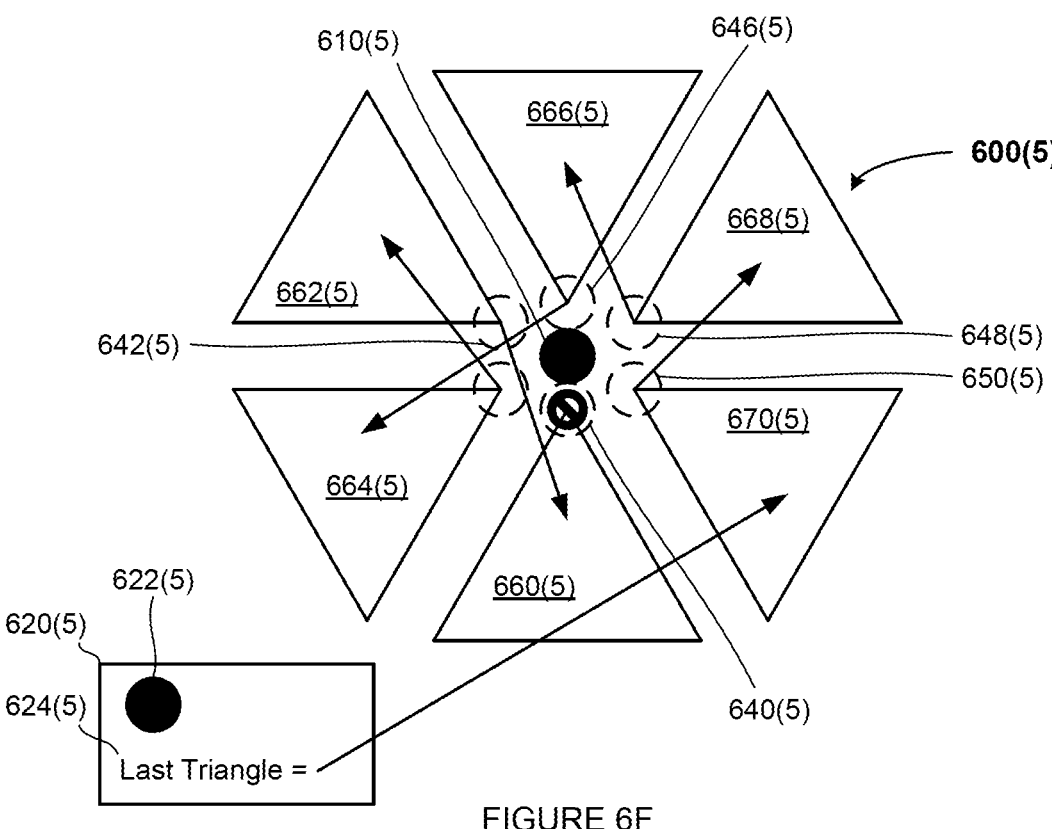

As shown in FIG. 6F, topology generator application 340 continues to process the mesh 600(5) to generate a linked list 620(5) that identifies all of the triangles that are adjacent to vertex 610(5). The last triangle pointer 624(5) points to triangle 670(5). The pointer associated with vertex 650(5) of triangle 670(5) points to triangle 668(5). The pointer associated with vertex 648(5) of triangle 668(5) points to triangle 666(5). The pointer associated with vertex 646(5) of triangle 666(5) points to triangle 664(5). The pointer associated with vertex 644(5) of triangle 664(5) points to triangle 662(5). The pointer associated with vertex 642(5) of triangle 662(5) points to triangle 660(5). The pointer associated with vertex 640(5) of triangle 660(5) is set to a null pointer, indicating that triangle 660(5) is the terminal triangle in the linked list 620(5). In this manner, the linked list identifies all six triangles that are adjacent to vertex 610(5). After processing all of the vertices of the triangles of the mesh 600(5), a set of linked lists, including linked list 620(5), is generated, where each linked list represents a different vertex and identifies the triangles that are connected to that vertex.

Figure 7A:
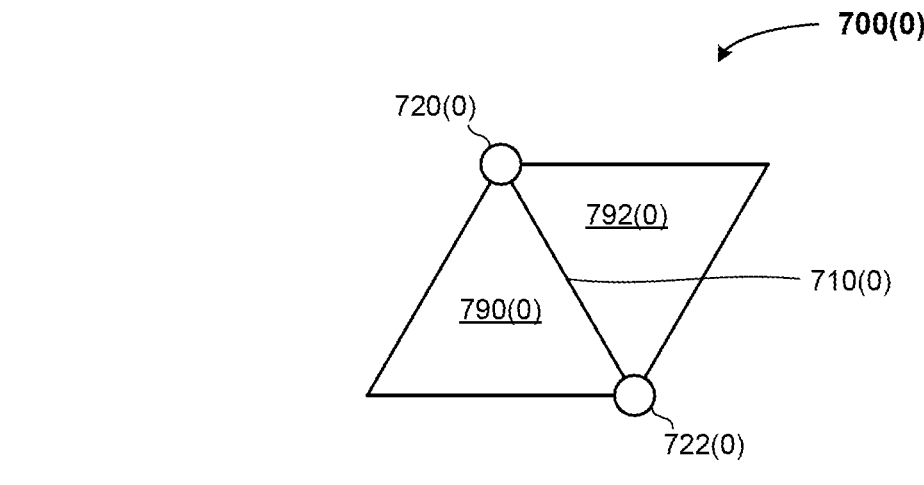
FIGS. 7A-7F illustrate generating an edge list, according to various embodiments.
Figure 7A:
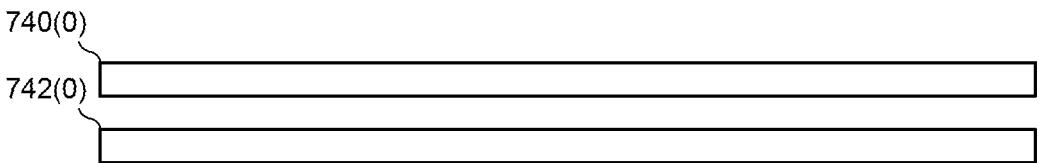

FIGS. 7A-7F illustrate generating an edge list, according to various embodiments. As shown in FIG. 7A, a mesh 700(0) includes two triangles 790(0) and 792(0) that are adjacent to an edge 710(0). The mesh 700(0) may be a portion of a larger mesh (not shown). Edge 710(0) is defined by two vertices 720(0) and 722(0) at the endpoints of edge 710(0). As described herein, topology generator application 340 generates a hash map 760(0) and an edge buffer 762(0). Topology generator application 340 uses the hash map 760(0) and the edge buffer 762(0) to identify the unique edges in the mesh 700(0).

Figure 7B:
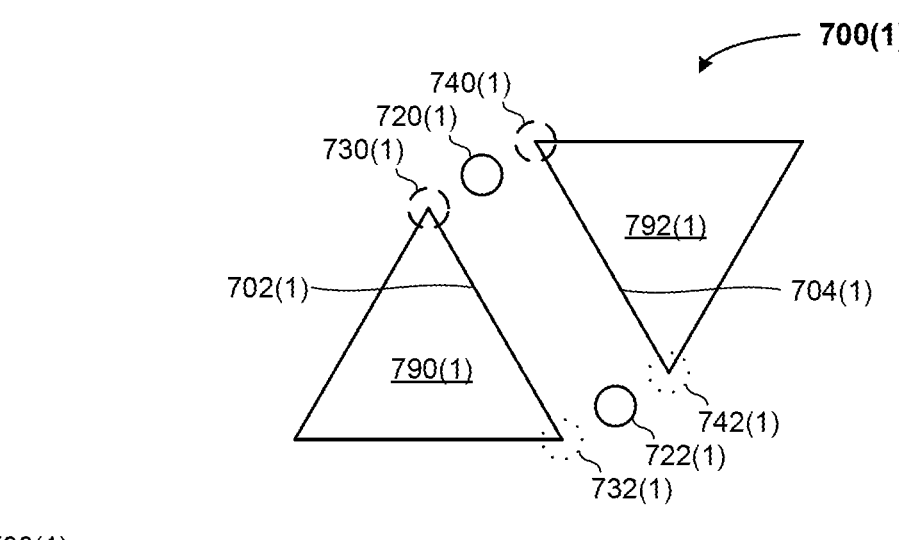
Figure 7B:
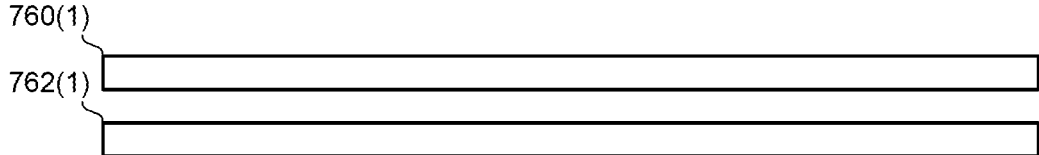

FIG. 7B shows an exploded view of the mesh 700(1), including the two triangles 790(1) and 792(1). Topology generator application 340 determines that triangle 790(1) is adjacent to edge 710(0) of FIG. 1 which maps to edge 702(1) of triangle 790(1). Topology generator application 340 determines that triangle 792(1) is adjacent to edge 710(0) of FIG. 1 which maps to edge 704(1) of triangle 792(1). Edge 702(1) is defined by vertices 730(1) and 732(1). Edge 704(1) is defined by vertices 740(1) and 742(1).

Figure 7C:
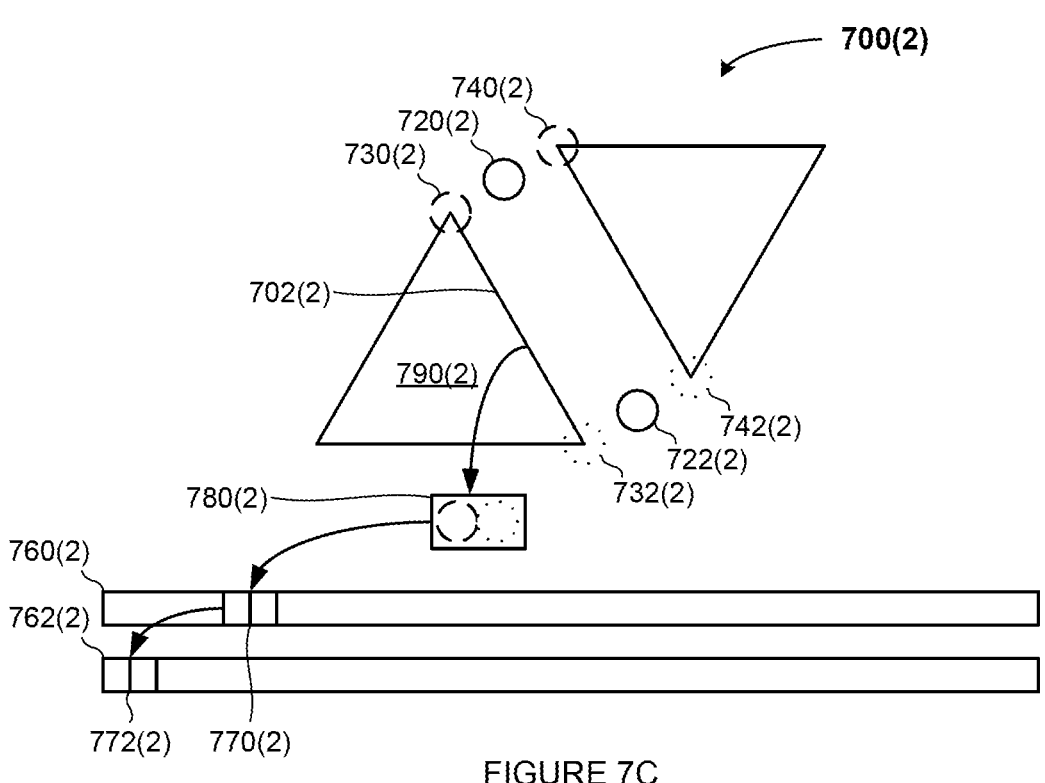

As shown in FIG. 7C, topology generator application 340 processes edge 702(2) of the mesh 700(2) by generating two hash values for edge 702(2) based on the indices of the two vertices 730(2) and 732(2) of edge 702(2). From these two hash values, topology generator application 340 generates a hash key 780(2) for edge 702(2) representing the position of an element 770(2) in the hash map 760(2) corresponding to edge 702(2). Because element 770(2) is newly generated, topology generator application 340 stores an index in element 770(2) that points to the data for edge 702(2) stored in element 772(2) of the edge buffer 762(2).

Figure 7D:
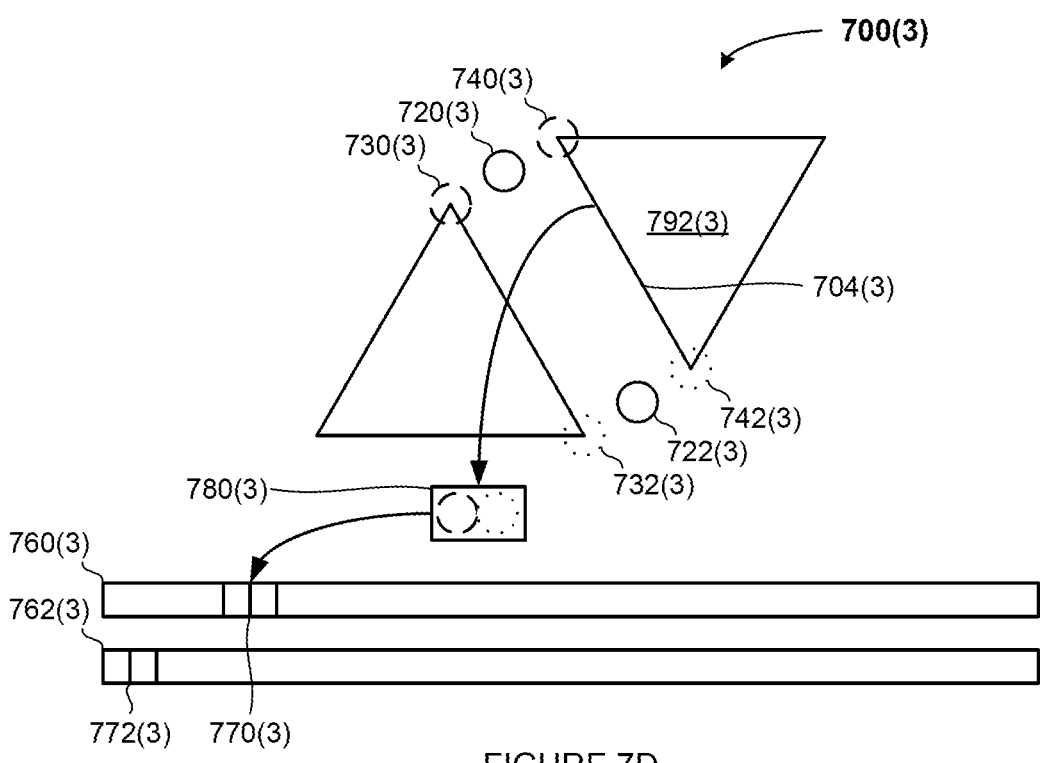
Figure 7E:
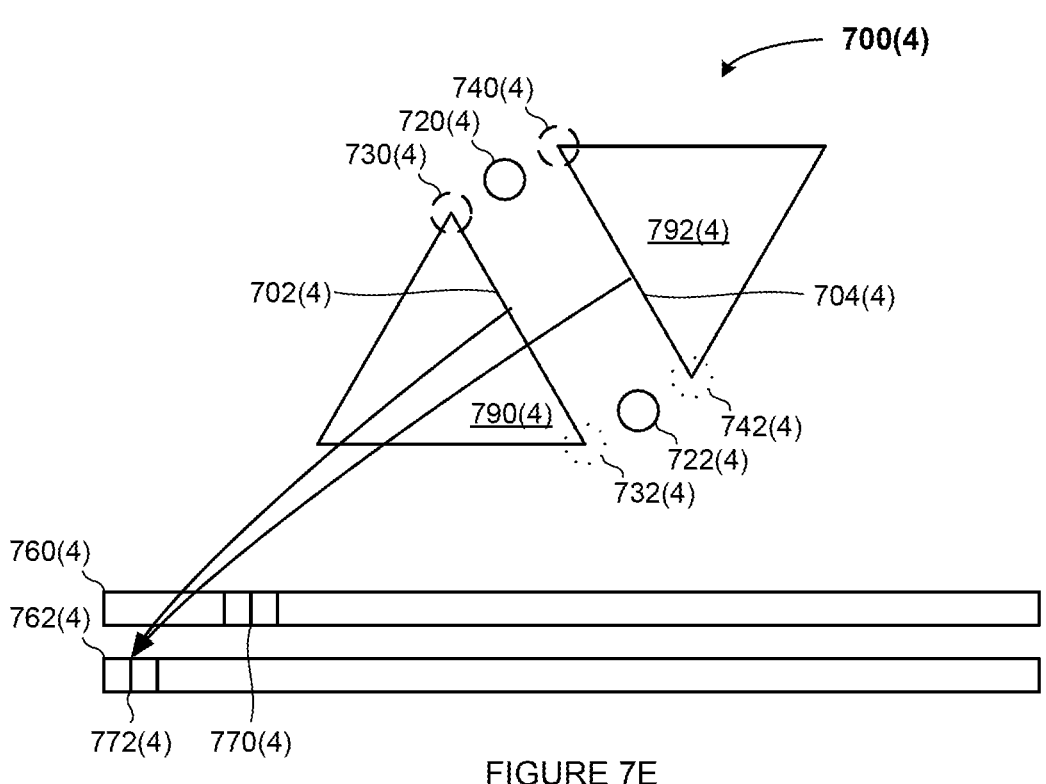

As shown in FIG. 7D, topology generator application 340 processes edge 704(3) of the mesh 700(3) by generating two hash values for edge 704(3) based on the indices of the two vertices 740(3) and 742(3) of edge 704(3). From these two hash values, topology generator application 340 generates a hash key 780(3) for edge 704(3) representing the position of an element 770(3) in the hash map 760(3) corresponding to edge 704(3). Because element 770(3) was previously generated when processing edge 704(3), a corresponding element 772(3) already exists in the edge buffer 762(2). Therefore, topology generator application 340 does not need to generate an element in the edge buffer 762(3). Topology generator application 340 stores an indicator in element 770(3) that a duplicate has been found. As shown in FIG. 7E, topology generator application 340 determines that triangles 790(4) and 792(4) share a common edge because both edge 702(4) of triangle 790(4) and edge 704(4) of triangle 792(4) reference the same element 772(4) in the edge buffer 762(4) via element 770(4) in the hash map 760(4).

Figure 7F:
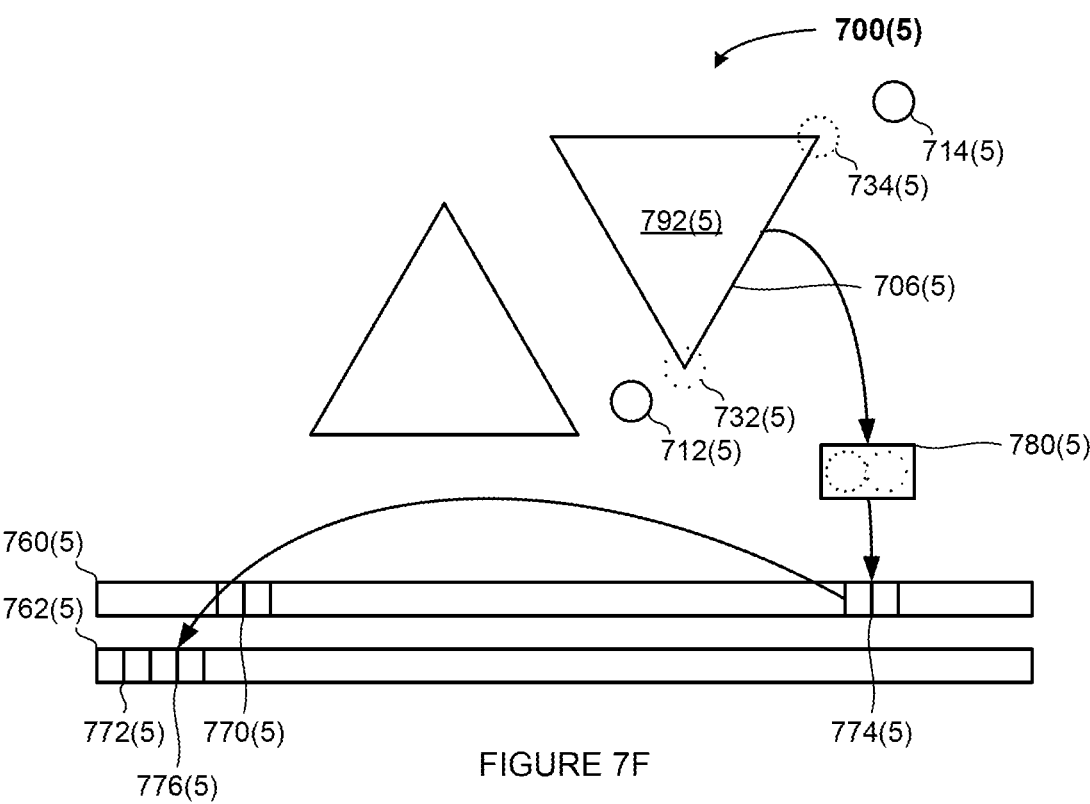

As shown in FIG. 7F, topology generator application 340 continues to process edges of the mesh 700(5). Topology generator application 340 determines that edge 706(5) has a first endpoint vertex 732(5) that maps to vertex 712(5) of the mesh 700(5). Topology generator application 340 determines that edge 706(5) has a second endpoint vertex 734(5) that maps to vertex 714(5) of the mesh 700(5). Topology generator application 340 processes edge 706(5) of the mesh 700(5) by generating two hash values for edge 706(5) based on the indices of the two vertices 732(5) and 734(5) of edge 706(5). From these two hash values, topology generator application 340 generates a hash key 780(5) for edge 706(5) representing the position of an element 774(5) in the hash map 760(5) corresponding to edge 706(5). Because element 774(5) is newly generated, topology generator application 340 stores an index in element 770(5) that points to the data for edge 706(5) stored in element 776(5) of the edge buffer 762(5). Further, topology generator application 340 determines that no other triangle in the mesh 700(5) includes edge 706(5). Therefore, topology generator application 340 stores an indicator in element 774(5) that edge 706(5) is an edge on the perimeter of the mesh 700(5). After processing all of the edges of the triangles of the mesh 700(5), each triangle is linked to neighboring triangles, along with identifiers of any discontinuities and identifiers of edges on the perimeter of the mesh 700(5).

FIG. 8 is a flow diagram of method steps for generating topological data by the computing system 100 of FIG. 1, according to various embodiments. The method steps may be performed by CPU 102, parallel processing subsystem 112, and/or the like. Additionally or alternatively, the method steps may be performed by one or more processing units and/or alternative parallel processors including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-7, persons of ordinary skill in the art will understand that any system configured to perform the method steps, in any order, is within the scope of the present disclosure.

As shown, a method 800 begins at operation 802, where a topology generator application 340 executing on a processing unit, such as one or more CPUs 102 or one or more PPUs 202, generates, for each vertex in a plurality of vertices of a mesh, a first hash value comprising an index and a second hash value comprising a checksum. In various embodiments, the mesh may be a 2D mesh, a 3D mesh, and/or the like. In various embodiments, the first hash value and the second hash value are determined from a position of the vertex and a set of attributes of the vertex. Topology generator application 340 uses any suitable hash function to generate the first hash value and the second hash value, such as a Wang hash function, an exclusive-or (XOR) shift hash function, and/or the like. In one or more embodiments, topology generator application 340 may use certain hash functions that generally operate on integer values, even though values for vertex attributes are represented, in some embodiments, by floating-point values. For example, since 32-bit unsigned integers contain the same number of bits as single precision floating-point values, topology generator application 340 may use a hash function suitable for 32-bit unsigned integer values to similarly perform a hash function on 32-bit binary representations of single-precision floating-point numbers without loss of generality.

At operation 804, topology generator application 340 processes one or more (e.g., all) the vertices of a mesh using a first index buffer. In one or more embodiments, one or more (e.g., all) vertices of the mesh may be distinct from the other vertices in the mesh. According to at least one embodiment, the mesh can be defined by generating first indices for a first index buffer based on the first hash values and the second hash values. In one or more embodiments, one or more (e.g., each) element in the first index buffer corresponds to a unique position and set of attributes, and multiple first indices for the first index buffer may be generated for multiple vertices (at least partially) in parallel. From the first hash value and the second hash value, topology generator application 340 may generate an additional final hash value for the vertex representing the position of an element in a hash map corresponding to the vertex. The index may be stored in an element of a hash map, where the element provides a reference to the data for a corresponding vertex stored in an element of the first index buffer. For newly generated hash map elements, the topology generator application 340 may store an index in the element of the hash map that points to the data for the vertex stored in the element of the first index buffer. If the element of the hash map was previously generated, then topology generator application 340 may also store an indicator in the element of the hash map that a duplicate has been found.

At operation 806, topology generator application 340 generates, for one or more (e.g., each) vertex in a plurality of vertices of a mesh, a third hash value comprising an index and a fourth hash value comprising a checksum. In various embodiments, the third hash value and the fourth hash value can be determined from the position of the vertex. According to various embodiments, topology generator application 340 may use any suitable hash function to generate the third hash value and the fourth hash value, such as a Wang hash function, an exclusive-or (XOR) shift hash function, and/or the like.

At operation 808, topology generator application 340 processes one or more (e.g., all) vertices of a mesh using a second index buffer. In one or more embodiments, one or more (e.g., each) referenced vertex of the second index buffer may have a unique position, and discontinuities are identified at the vertex level. Processing of the vertices of a mesh using a second index buffer may include, in one or more embodiments, generating indices for a second index buffer based on the third hash values and the fourth hash values, where one or more (e.g., each) element in the second index buffer corresponds to a unique position. In one or more embodiments, multiple second indices for the second index buffer may be generated for multiple vertices (at least partially) in parallel. From the third hash value and the fourth hash value, topology generator application 340 can generate an additional final hash value for the vertex representing the position of an element in a hash map corresponding to the vertex. Topology generator application 340 generates and stores an index in an element of a hash map, where the element is a reference to the data for a corresponding vertex stored in an element of the second index buffer. If the element of the hash map is newly generated, then topology generator application 340 stores an index in the element of the hash map that points to the data for the vertex stored in the element of the second index buffer. If the element of the hash map was previously generated, then topology generator application 340 stores an indicator in the element of the hash map that a duplicate has been found.

At operation 810, topology generator application 340 generates a list of geometric primitives that are adjacent to the vertices represented in the second index buffer. In one or more embodiments, topology generator application 340 may generate an adjacency list, in the form of a linked list, for at least one (e.g., each) vertex in the mesh. A linked list for a vertex may be initialized with an identifier that identifies the vertex. Topology generator application 340 may further initialize the linked list for the vertex with a last triangle pointer that is set to a null pointer, indicating that the linked list does not point to any triangles. As the triangles in the mesh are processed, topology generator application 340 determines whether a (e.g., each) triangle is adjacent to the vertex. When a triangle is determined to be adjacent to the vertex, topology generator application 340 updates the last triangle pointer of the linked list to point to the that triangle ("first triangle"). Topology generator application 340 then sets a pointer associated with a vertex of the first triangle to a null pointer, indicating that the first triangle is the terminal triangle in the linked list.

When topology generator application 340 determines that a second triangle is adjacent to the vertex, the last triangle pointer of the linked list may be updated to point to the second triangle. Topology generator application 340 then sets a pointer associated with a vertex of the second triangle to point to the first triangle. The pointer associated with the vertex of the first triangle remains set to a null pointer, indicating that the first triangle is the terminal triangle in the linked list. In various embodiments, once all of the vertices of the triangles of the mesh are processed in such of manner, each linked list that is generated represents a different vertex and identifies the triangles that are connected to that vertex.

At operation 812, topology generator application 340 generates an edge buffer, where one or more (e.g., each) of the edges represented in the edge buffer corresponds to a unique edge. In one or more embodiments, to generate the edge buffer, topology generator application 340 processes each edge of the mesh by generating two hash values for the edge based on the indices of the two vertices defining the endpoints of the edge. From these two hash values, topology generator application 340 generates a hash key for the edge representing the position of an element in a hash map corresponding to the edge. If the element is newly generated, then topology generator application 340 stores an index in the element in the hash map that points to the data for the edge stored in an element of the edge buffer. If the element was previously generated when processing a previous edge, then a corresponding element already exists in the edge buffer. Therefore, topology generator application 340 does not need to generate an element in the edge buffer. Topology generator application 340 stores an indicator in the element in the hash map that a duplicate has been found. Once all of the edges of the triangles of the mesh are processed, each triangle is linked to neighboring triangles, along with identifiers of any discontinuities and identifiers of edges on the perimeter of the mesh. If a hash map element refers to an edge that has a duplicate, then the edge is a common edge shared by multiple triangles. If the hash map element refers to an edge that does not have a duplicate, then the edge is an edge on the perimeter of the mesh.

The method 800 then terminates. In one or more embodiments, the topological data generated by method 800 and associated with the mesh may include certain output data structures with topological data related to the mesh including, without limitation, one or more of the first index buffer, the second index position buffer, the list of geometric primitives for each vertex represented in the second index buffer, or the edge buffer.

As described herein, this topological data may be used in subsequent computational geometry tasks. In some examples, these computational geometry tasks may include edge decimation, where a large mesh with fine resolution is reduced to a simpler mesh for certain applications. In the video animation context, a high-resolution mesh may be used when an animated character is near to the front of a viewing surface, such as near the screen during an animated film or near to the point of view of a player of a video game. However, this high-resolution mesh is not necessary when the animated character is at a medium range or far away from the viewer. In such cases, the mesh may be simplified to a lower resolution. For example, without limitation, a high-resolution mesh containing 35 million triangles may be used when an animated character is near to the front of a viewing surface, and a low-resolution mesh containing 30,000 triangles may be used when an animated character is far away.

In some examples, the topological data that is generated using the disclosed techniques may be used to train a neural network that processes computer graphics objects, computer graphics set designs, three-dimensional images, or the like. Training of a neural network may be more efficient, more accurate, or otherwise more performant when the neural network is trained using the topological data generated by the disclosed techniques relative to the raw topological data from the input mesh.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In sum, various embodiments include techniques for generating topological data of meshes via parallel execution on graphics hardware. The techniques perform topology generation in a series of four processes, where each process is suitable for execution on a processing unit with multiple parallel processors, such as a GPU. A first process hashes each component (such as position, color, normal vector, etc.) of a vertex in the mesh. The first process generates two hash values for each vertex: an index into a hash table and a checksum to store in the hash table. The process generates two hash values in parallel and performs a pair of tests in parallel, resulting in efficient execution on a parallel processor. A second process performs deduplication, which removes duplicate vertices in the mesh. For example, without limitation, two triangles that abut along a common edge may share two vertices. Each of the two vertices may appear twice in the mesh, one for each triangle, and have identical attributes. The topology generator processes the three vertices of each triangle in parallel to find and remove such duplicate vertices from the mesh. A third process generates an adjacency list that identifies groups of multiple triangles that meet at a single vertex. This process involves a pair of operations that may be performed in parallel. A fourth process generates a list of unique edges in a fashion similar to the third process that performs vertex deduplication. This process includes an element allocation process that may be performed efficiently in parallel. Each of the four processes may be fully performed in parallel. The processes are, therefore, particularly suitable for execution on graphics hardware or other highly parallel processing systems.

At least one technical advantage of the disclosed techniques relative to the prior art is that, with the disclosed techniques, a processor may perform more steps of the topology generation process in parallel, thereby taking advantage of the processing capabilities of parallel processing subsystems that include multiple parallel processing units. The disclosed techniques may thereby result in significant reduction of the time required by geometry processing for parallel generation of topological data on graphics hardware. As a result, mesh topologies are generated with decreased latency relative to prior conventional techniques. This decreased latency leads to higher computational performance relative to prior techniques. These advantages represent one or more technological improvements over prior art approaches.

1. In some embodiments, a method comprises generating, for at least one vertex in a plurality of vertices of a mesh, first indices for a first index buffer, wherein at least one element in the first index buffer corresponds to a unique position and a set of attributes; generating, for at least one vertex in the plurality of vertices of the mesh, second indices for a second index buffer, wherein at least one element in the second index buffer corresponds to a unique position; generating, for at least one vertex represented in the second index buffer, a list of geometric primitives that are adjacent to the at least one vertex; generating an edge buffer, wherein at least one edge represented in the edge buffer corresponds to a unique edge of the mesh; rendering, using one or more processing units, a graphical representation of the mesh using at least the list of geometric primitives, the edge buffer, and one or more of the first and second index buffers.

2. The method of clause 1, further comprising: generating, for at least one vertex in the plurality of vertices of the mesh, a first hash value comprising an index and a second hash value comprising a checksum, wherein the first hash value and the second hash value are determined from a position of the vertex and a set of attributes of the vertex, wherein one or more of the first indices for the first index buffer are generated based at least on the first hash values and the second hash values.

3. The method of clauses 1 or 2, wherein the generating of the first hash value and the second hash value for a first vertex in the plurality of vertices is performed at least partially in parallel with the generating of the first hash value and the second hash value for a second vertex in the plurality of vertices.

4. The method of any of clauses 1-3, further comprising: generating, for at least one vertex in the plurality of vertices of the mesh, a first hash value comprising an index and a second hash value comprising a checksum, wherein the first hash value and the second hash value are determined from a position of the vertex, and wherein one or more of the second indices for the second index buffer are generated based at least on the first hash values and the second hash values.

5. The method of any of clauses 1-4, wherein the generating of the first index buffer comprises generating a first element in the first index buffer for a first vertex in the plurality of vertices at least partially in parallel with generating a second element in the first index buffer for a second vertex in the plurality of vertices.

6. The method of any of clauses 1-5, wherein the generating of the second index buffer comprises generating a first element in the second index buffer for a first vertex in the plurality of vertices at least partially in parallel with generating a second element in the second index buffer for a second vertex in the plurality of vertices.

7. The method of any of clauses 1-6, wherein generating the list of geometric primitives comprises generating a first list of geometric primitives that are adjacent to a first vertex in the plurality of vertices at least partially in parallel with generating a second list of geometric primitives that are adjacent to a second vertex in the plurality of vertices.

8. The method of any of clauses 1-7, wherein generating the list of geometric primitives comprises performing, for at least one geometric primitive that is adjacent to the vertex, an atomic exchange operation on an index stored with the vertex.

9. The method of any of clauses 1-8, wherein the generating of the edge buffer comprises generating a first element in the edge buffer for a first pair of vertices in the plurality of vertices at least partially in parallel with generating a second element in the edge buffer for a second pair of vertices in the plurality of vertices.

10. The method of any of clauses 1-9, wherein the set of vertex attributes comprises one or more of a color, a normal vector, or a reflectance coefficient.

11. The method of any of clauses 1-10, wherein generating the first indices for the first index buffer comprises: performing a first test to determine that a first vertex in the plurality of vertices has been found in the first index buffer; allocating an element in the first index buffer for the first vertex; and setting a first flag indicated that the first vertex has been found.

12. The method of any of clauses 1-11, wherein generating the first indices for the first index buffer comprises: performing a second test to determine that a second flag for a second vertex in the plurality of vertices indicates that the second vertex has been found in the first index buffer; and indicating that a duplicate element has been found in the first index buffer.

13. The method of any of clauses 1-12, wherein the first test and the second test are performed using a single atomic compare-exchange operation.

14. The method of any of clauses 1-13, wherein the setting of the first flag is performed atomically.

15. The method of any of clauses 1-14, wherein generating the list of geometric primitives comprises: setting a first index for a first geometric primitive in the list of geometric primitives to identify a first vertex in the plurality of vertices; and setting a second index for the first vertex to identify the first geometric primitive.

16. The method of any of clauses 1-15, wherein the setting of the first index and the setting of the second index are performed using a single atomic exchange operation.

17. The method of any of clauses 1-16, wherein the generating of the edge buffer comprises: generating a first element in the edge buffer for a first edge corresponding to a first pair of vertices in the plurality of vertices; and incrementing a reference counter for the first edge using an atomic operation.

18. The method of any of clauses 1-17, wherein the generating of the edge buffer comprises: generating, for at least one edge in the mesh, a first hash value comprising an index and a second hash value comprising a checksum; and generating the edge buffer based at least on the first hash values and the second hash values.

19. In some embodiments, a processor comprises one or more circuits to: generate, for at least one vertex in a plurality of vertices of a mesh, first indices for a first index buffer, wherein at least one element in the first index buffer corresponds to a unique position and set of attributes; generate, for at least one vertex in the plurality of vertices of the mesh, second indices for a second index buffer, wherein at least one element in the second index buffer corresponds to a unique position; generate, for at least one vertex represented in the second index buffer, a list of geometric primitives that are adjacent to the at least one vertex;

generate an edge buffer, wherein at least one edge represented in the edge buffer corresponds to a unique edge of the mesh; and render a graphical representation of the mesh using the first index buffer, second index buffer, list of geometric primitives, and the edge buffer.

20. The processor of clause 19, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

21. In some embodiments, a system comprises one or more processing units to render a graphical representation of a polygon mesh based at least on one or more index buffers corresponding to a plurality of vertices of a mesh, a list of geometric primitives that are adjacent to at least one vertex of the plurality of vertices, and an edge buffer that includes at least one edge corresponding to a unique edge of the mesh.

22. The system of clause 21, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific non-limiting examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, without limitation, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:

generating, for at least one vertex in a plurality of vertices of a mesh, first indices for a first index buffer, wherein a first element in the first index buffer uniquely corresponds to a first position and a set of attributes;

generating, for at least one vertex in the plurality of vertices of the mesh, second indices for a second index buffer, wherein a second element in the second index buffer uniquely corresponds to a second position;

generating, for at least one vertex represented in the second index buffer, a list of geometric primitives that are adjacent to the at least one vertex;

generating an edge buffer, wherein at least one edge represented in the edge buffer corresponds to a unique edge of the mesh; and rendering, using one or more processing units, a graphical representation of the mesh using at least the list of geometric primitives, the edge buffer, and one or more of the first and second index buffers.

2. The method of claim 1, further comprising: generating, for at least one vertex in the plurality of vertices of the mesh, a first hash value comprising an index and a second hash value comprising a checksum, wherein the first hash value and the second hash value are determined from a position of the vertex and a set of attributes of the vertex, wherein one or more of the first indices for the first index buffer are generated based at least on the first hash values and the second hash values.

3. The method of claim 2, wherein the generating of the first hash value and the second hash value for a first vertex in the plurality of vertices is performed at least partially in parallel with the generating of the first hash value and the second hash value for a second vertex in the plurality of vertices.

4. The method of claim 1, further comprising: generating, for at least one vertex in the plurality of vertices of the mesh, a first hash value comprising an index and a second hash value comprising a checksum, wherein the first hash value and the second hash value are determined from a position of the vertex, and wherein one or more of the second indices for the second index buffer are generated based at least on the first hash values and the second hash values.

5. The method of claim 1, wherein the generating of the first index buffer comprises generating a first element in the first index buffer for a first vertex in the plurality of vertices at least partially in parallel with generating a second element in the first index buffer for a second vertex in the plurality of vertices.

6. The method of claim 1, wherein the generating of the second index buffer comprises generating a first element in the second index buffer for a first vertex in the plurality of vertices at least partially in parallel with generating a second element in the second index buffer for a second vertex in the plurality of vertices.

7. The method of claim 1, wherein generating the list of geometric primitives comprises generating a first list of geometric primitives that are adjacent to a first vertex in the plurality of vertices at least partially in parallel with generating a second list of geometric primitives that are adjacent to a second vertex in the plurality of vertices.

8. The method of claim 1, wherein generating the list of geometric primitives comprises performing, for at least one geometric primitive that is adjacent to the vertex, an atomic exchange operation on an index stored with the vertex.

9. The method of claim 1, wherein the generating of the edge buffer comprises generating a first element in the edge buffer for a first pair of vertices in the plurality of vertices at least partially in parallel with generating a second element in the edge buffer for a second pair of vertices in the plurality of vertices.

10. The method of claim 1, wherein the set of vertex attributes comprises one or more of a color, a normal vector, or a reflectance coefficient.

11. The method of claim 1, wherein generating the first indices for the first index buffer comprises:

performing a first test to determine that a first vertex in the plurality of vertices has been found in the first index buffer;

allocating an element in the first index buffer for the first vertex; and setting a first flag indicated that the first vertex has been found.

12. The method of claim 11, wherein generating the first indices for the first index buffer comprises:

performing a second test to determine that a second flag for a second vertex in the plurality of vertices indicates that the second vertex has been found in the first index buffer; and indicating that a duplicate element has been found in the first index buffer.

13. The method of claim 12, wherein the first test and the second test are performed using a single atomic compare-exchange operation.

14. The method of claim 11, wherein the setting of the first flag is performed atomically.

15. The method of claim 1, wherein generating the list of geometric primitives comprises:

setting a first index for a first geometric primitive in the list of geometric primitives to identify a first vertex in the plurality of vertices; and setting a second index for the first vertex to identify the first geometric primitive.

16. The method of claim 15, wherein the setting of the first index and the setting of the second index are performed using a single atomic exchange operation.

17. The method of claim 1, wherein the generating of the edge buffer comprises:

generating a first element in the edge buffer for a first edge corresponding to a first pair of vertices in the plurality of vertices; and incrementing a reference counter for the first edge using an atomic operation.

18. The method of claim 1, wherein the generating of the edge buffer comprises:

generating, for at least one edge in the mesh, a first hash value comprising an index and a second hash value comprising a checksum; and generating the edge buffer based at least on the first hash values and the second hash values.

19. A processor, comprising:

one or more circuits to:

generate, for at least one vertex in a plurality of vertices of a mesh, first indices for a first index buffer, wherein a first element in the first index buffer uniquely corresponds to a first position and a set of attributes;

generate, for at least one vertex in the plurality of vertices of the mesh, second indices for a second index buffer, wherein a second element in the second index buffer uniquely corresponds to a second position;

generate, for at least one vertex represented in the second index buffer, a list of geometric primitives that are adjacent to the at least one vertex;

generate an edge buffer, wherein at least one edge represented in the edge buffer corresponds to a unique edge of the mesh; and render a graphical representation of the mesh using the first index buffer, second index buffer, list of geometric primitives, and the edge buffer.

20. The processor of claim 19, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

21. A system, comprising:

one or more processing units to render a graphical representation of a polygon mesh based at least on one or more index buffers corresponding to a plurality of vertices of a mesh, a list of geometric primitives that are adjacent to at least one vertex of the plurality of vertices, and an edge buffer that includes at least one edge corresponding to a unique edge of the mesh, wherein a first element included in one of the one or more index buffers uniquely corresponds to a first position and a set of attributes.

22. The system of claim 21, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *